(12) United States Patent
Asano et al.

(10) Patent No.: US 11,801,705 B2
(45) Date of Patent: Oct. 31, 2023

(54) IMAGE FORMING SYSTEM, IMAGE FORMING APPARATUS, AND SHEET PROCESSING DEVICE

(71) Applicant: Ricoh Company, Ltd., Tokyo (JP)

(72) Inventors: Sho Asano, Kanagawa (JP); Wataru Takahashi, Tokyo (JP); Yoshito Suzuki, Chiba (JP); Shinya Monma, Kanagawa (JP); Joji Akiyama, Kanagawa (JP); Yohsuke Haraguchi, Kanagawa (JP); Wataru Nozaki, Kanagawa (JP); Tomohiro Furuhashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 197 days.

(21) Appl. No.: 17/343,927

(22) Filed: Jun. 10, 2021

(65) Prior Publication Data

US 2021/0387467 A1  Dec. 16, 2021

(30) Foreign Application Priority Data

Jun. 12, 2020  (JP) .................................. 2020-102359
Feb. 24, 2021  (JP) .................................. 2021-027361

(51) Int. Cl.
  *B65H 37/04* (2006.01)
  *B41M 7/00* (2006.01)
  *B65H 29/66* (2006.01)

(52) U.S. Cl.
  CPC .......... *B41M 7/0027* (2013.01); *B65H 29/66* (2013.01); *B65H 37/04* (2013.01); *B65H 2301/4454* (2013.01); *B65H 2301/516* (2013.01)

(58) Field of Classification Search
  CPC ........ B65H 29/66; B65H 37/04; B65H 5/301; B65H 39/042; B65H 31/02; B65H 29/14; B65H 31/24
  See application file for complete search history.

(56) References Cited

U.S. PATENT DOCUMENTS 5,422,705 A * 6/1995 Omelchenko ...... G03G 15/6538
                                                    399/81
6,494,453 B1 * 12/2002 Yamada ................. B65H 31/24
                                                    271/298

(Continued)

FOREIGN PATENT DOCUMENTS

| JP | 9-164593 | 6/1997 |
| JP | 2006-160429 | 6/2006 |
| JP | 2010-160353 | 7/2010 |

*Primary Examiner* — Patrick H Mackey
(74) *Attorney, Agent, or Firm* — XSENSUS LLP

(57) ABSTRACT

An image forming system includes an image forming apparatus, a sheet processing device, and control circuitry. The image forming apparatus forms an image on a sheet. The sheet processing device performs post-processing on the sheet. The sheet processing device includes a first conveyance path through which the sheet is conveyed and subjected to the post-processing and a second conveyance path through which the sheet is conveyed without the post-processing. In response to an instruction of print jobs including both a print job of one or N copies subjected to the post-processing and a print job not subjected to the post-processing, the circuitry executes the job not subjected to the post-processing during execution of an M-th copy of the job subjected to the post-processing and causes the sheet to be conveyed through the second conveyance path, where N is two or greater and M satisfies 1≤M<N.

19 Claims, 30 Drawing Sheets

(56) References Cited

U.S. PATENT DOCUMENTS

| | | | | |
|---|---|---|---|---|
| 7,684,722 | B2* | 3/2010 | Sawada | G03G 15/50 399/82 |
| 8,233,175 | B2* | 7/2012 | Richards | G06F 3/1217 399/361 |
| 8,433,215 | B2* | 4/2013 | Tsujita | G03G 15/2039 399/82 |
| 8,600,288 | B2* | 12/2013 | Shiraki | G03G 15/6552 399/85 |
| 9,150,371 | B2* | 10/2015 | Mutsuno | G06F 3/1259 |
| 11,261,043 | B2* | 3/2022 | Suzuki | B32B 37/142 |
| 11,269,280 | B2* | 3/2022 | Takahashi | B32B 41/00 |
| 11,292,240 | B2* | 4/2022 | Akiyama | B65H 5/305 |
| 11,500,323 | B2* | 11/2022 | Takahashi | B65H 5/305 |
| 11,584,606 | B2* | 2/2023 | Haraguchi | B65H 3/32 |
| 11,642,878 | B2* | 5/2023 | Monma | B32B 37/0053 156/378 |
| 2005/0084308 | A1* | 4/2005 | Nakamura | G03G 15/50 399/407 |
| 2018/0257900 | A1 | 9/2018 | Suzuki et al. | |
| 2019/0010011 | A1 | 1/2019 | Watanabe et al. | |
| 2019/0276263 | A1 | 9/2019 | Hidaka et al. | |
| 2019/0284008 | A1 | 9/2019 | Sakano et al. | |
| 2019/0284009 | A1 | 9/2019 | Suzuki et al. | |
| 2019/0284010 | A1 | 9/2019 | Asami et al. | |
| 2019/0284011 | A1 | 9/2019 | Furuhashi et al. | |
| 2019/0284012 | A1 | 9/2019 | Yoneyama et al. | |
| 2019/0367317 | A1 | 12/2019 | Haraguchi et al. | |
| 2020/0140222 | A1 | 5/2020 | Takahashi et al. | |
| 2020/0239265 | A1 | 7/2020 | Suzuki et al. | |
| 2020/0247107 | A1 | 8/2020 | Morinaga et al. | |
| 2020/0247636 | A1 | 8/2020 | Furuhashi et al. | |
| 2020/0270093 | A1 | 8/2020 | Suzuki et al. | |
| 2020/0338877 | A1 | 10/2020 | Takahashi et al. | |
| 2020/0341414 | A1 | 10/2020 | Watanabe et al. | |
| 2020/0385231 | A1 | 12/2020 | Kunieda et al. | |
| 2020/0407187 | A1 | 12/2020 | Hidaka et al. | |
| 2021/0039900 | A1 | 2/2021 | Shimazu et al. | |
| 2021/0039916 | A1 | 2/2021 | Sugiyama et al. | |
| 2021/0325808 | A1* | 10/2021 | Morinaga | G03G 15/5029 |
| 2022/0053008 | A1* | 2/2022 | Iyer | H04L 63/1483 |
| 2022/0289512 | A1* | 9/2022 | Takahashi | B32B 37/0053 |
| 2022/0291620 | A1* | 9/2022 | Fujita | B32B 37/0053 |
| 2022/0380166 | A1* | 12/2022 | Nozaki | B65H 43/00 |
| 2023/0001731 | A1* | 1/2023 | Haraguchi | B32B 37/142 |

\* cited by examiner

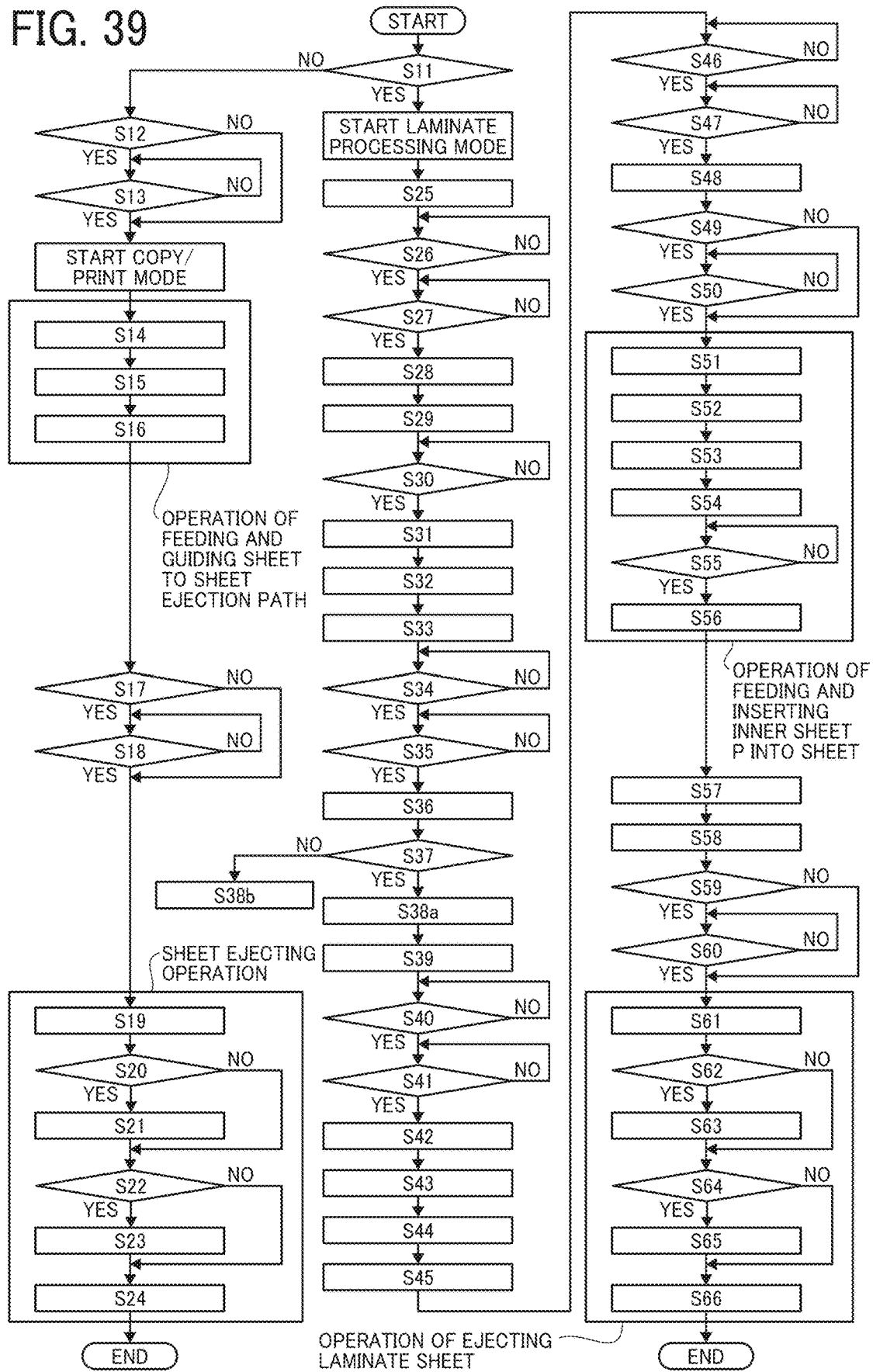

IMAGE FORMING SYSTEM, IMAGE FORMING APPARATUS, AND SHEET PROCESSING DEVICE

CROSS-REFERENCE TO RELATED APPLICATIONS

This patent application is based on and claims priority pursuant to 35 U.S.C. § 119(a) to Japanese Patent Application Nos. 2020-102359, filed on Jun. 12, 2020, and 2021-027361, filed on Feb. 24, 2021, in the Japan Patent Office, the entire disclosure of each of which is hereby incorporated by reference herein.

BACKGROUND

Technical Field

Embodiments of the present disclosure relate to an image forming system, an image forming apparatus, and a sheet processing device.

Related Art

There is known a lamination technology of inserting an inner sheet (e.g., paper or photo) between a two-ply lamination sheet or lamination film (e.g., a lamination pouch or lamination folder) and applying heat and pressure to the two-ply lamination sheet to bond the two-ply lamination sheet. The two-ply sheet is made of two sheets (plies) bonded (sealed) on one side as if one sheet is folded.

In a laminate processing machine, for example, an operation of sandwiching inner sheet (paper, photograph or the like) between films is manually performed one by one. However, it is troublesome to peel off a film by hand due to poor slip due to the presence of an adhesive layer on the inside of the film, and it is also troublesome to hold a sheet or the like to be held in an accurate position after peeling off. Further, when one sheet was prepared and set in the processing machine (laminator), the laminate processing took 30 to 60 seconds, so it is necessary to wait until the next process. As a result, a person cannot leave a laminate processing device for a long time even when the person laminates only several tens of sheets. The person needs to repeat works of sandwiching an inner sheet, set a lamination sheet and performs laminate processing, and sandwiching the sheet while waiting. There was a problem that the user had to repeat the work, which required time and manpower. Further, if it is attempted to avoid it, a dedicated laminator device using a roll film is needed. However, such a dedicated laminator device is very expensive (hundreds of thousands of yen to millions of yen).

For example, for a lamination sheet in which two sheets are connected at one side, a laminator separates the two sheets from each other and inserts an inner sheet between the two sheets.

SUMMARY

In an aspect of the present disclosure, there is provided an image forming system that includes an image forming apparatus, a sheet processing device, and control circuitry. The image forming apparatus forms an image on a sheet. The sheet processing device performs post-processing on the sheet. The sheet processing device includes a first conveyance path through which the sheet is to be conveyed and subjected to the post-processing and a second conveyance path through which the sheet is to be conveyed without being subjected to the post-processing. In response to an instruction of a plurality of print jobs including both a print job of one copy or N copies subjected to the post-processing and a print job not subjected to the post-processing, the control circuitry executes the print job not subjected to the post-processing during execution of an M-th copy of the print job subjected to the post-processing and causes the sheet to be conveyed through the second conveyance path, where N is equal to or greater than two and M satisfies a relation of $1 \leq M < N$.

In another aspect of the present disclosure, there is provided an image forming apparatus, that includes an image forming device, a sheet processing device, and control circuitry. The image forming device forms an image on a sheet. The sheet processing device performs post-processing on the sheet. The sheet processing device includes a first conveyance path through which the sheet is to be conveyed and subjected to the post-processing and a second conveyance path through which the sheet is to be conveyed without being subjected to the post-processing. In response to an instruction of a plurality of print jobs including both a print job of one copy or N copies subjected to the post-processing and a print job not subjected to the post-processing, the control circuitry executes the print job not subjected to the post-processing during execution of an M-th copy of the print job subjected to the post-processing and causes the sheet to be conveyed through the second conveyance path, where N is equal to or greater than two and M satisfies a relation of $1 \leq M < N$.

In still another aspect of the present disclosure, there is provided a sheet processing device that includes a first conveyance path through which a sheet is to be conveyed and subjected to post-processing and a second conveyance path through which the sheet is to be conveyed downstream in a conveyance direction without being subjected to the post-processing. In response to an instruction of a plurality of print jobs including both a print job of one copy or N copies subjected to the post-processing and a print job not subjected to the post-processing, the control circuitry executes the print job not subjected to the post-processing during execution of an M-th copy of the print job subjected to the post-processing;

and causes the sheet to be conveyed through the second conveyance path, where N is equal to or greater than two and M satisfies a relation of $1 \leq M < N$.

BRIEF DESCRIPTION OF THE DRAWINGS

The aforementioned and other aspects, features, and advantages of the present disclosure would be better understood by reference to the following detailed description when considered in connection with the accompanying drawings, wherein:

FIG. 39 is a flowchart of a series of operations from a start instruction of each sheet feeding to sheet ejection.

Figure 1:
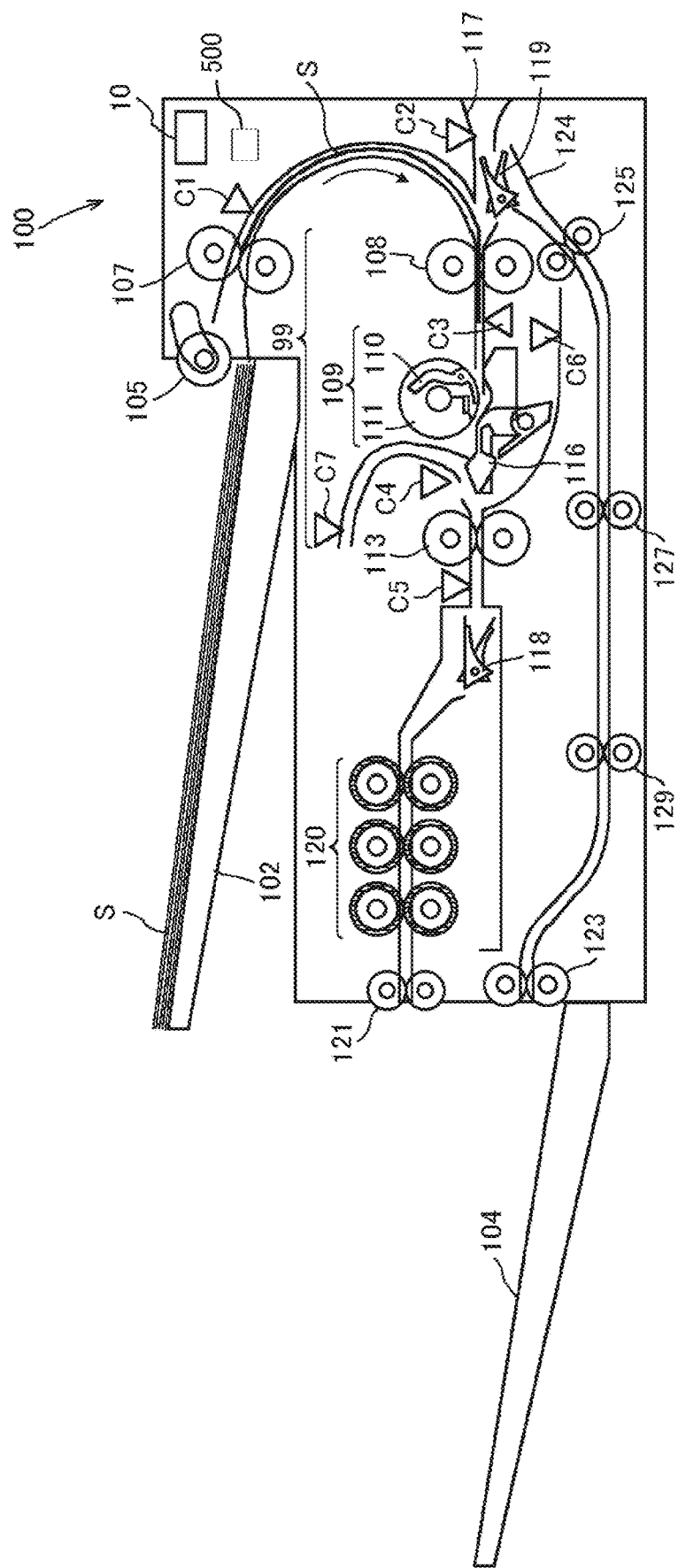
FIG. 1 is a schematic view illustrating an overall configuration of a sheet processing device according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

FIG. 1 is a schematic view illustrating a general arrangement of a sheet processing device according to one embodiment of the present disclosure. A sheet processing device 100 according to the present embodiment is to separate two sheets (plies) of a two-ply sheet (hereinafter referred to as a lamination sheet S) and to insert and sandwich a sheet-shaped medium (hereinafter referred to as an inner sheet P) between the separated sheets of the two-ply sheet.

The lamination sheet S is a two-ply sheet in which two sheets are overlapped and bonded together at a portion (or a side) of the two-ply sheet. For example, there is a two-ply sheet in which a first side is a transparent sheet such as a transparent polyester sheet and the opposite side is a transparent or opaque sheet and bonded to the other sheet on one side of the two-ply sheet. The two-ply sheet also includes a lamination film.

The inner sheet P is an example of the sheet medium that is inserted into the two-ply sheet. The sheet medium may be, for example, thick paper, postcards, envelopes, plain paper, thin paper, coated paper, art paper, tracing paper, and overhead projector (OHP) transparencies.

As illustrated in FIG. 1, a sheet processing device 100 includes a sheet tray 102, a pickup roller 105, and a conveyance roller pair 107. The sheet tray 102 functions as a first sheet loader on which the lamination sheets S are placed. The pickup roller 105 feeds the lamination sheet S from the sheet tray 102. The inner sheet P can be fed from a sheet feeding unit 301 of an image forming apparatus 300, which will be described later. A desired image is printed on the inner sheet P to be inserted into the lamination sheet S by a method utilizing a copier or a printer of the image forming apparatus 300, and the inner sheet P is insertable in an in-line manner.

A conveyance sensor C1 that detects the conveyance position of the lamination sheet S is disposed downstream from the conveyance roller pair 107 in the conveyance direction of the lamination sheet S. The inner sheet P fed from the image forming apparatus 300 (see FIG. 9) disposed upstream from the sheet processing device 100 is delivered into the sheet processing device 100 by an inner-sheet delivery guide 117 of the sheet processing device 100. The inner-sheet delivery guide 117 is provided with a conveyance sensor C2 that detects the conveyance position of the inner sheet P.

The sheet processing device 100 includes an entrance roller pair 108 as a first conveyor, a winding roller 109 as a rotator, the exit roller pair 113 as a second conveyor, and the ejection tray 104 as a sheet stacker to stack ejected lamination sheets S. The entrance roller pair 108, the winding roller 109, the exit roller pair 113, and the ejection tray 104 are disposed downstream from the conveyance roller pair 107 in the sheet conveyance direction. The sheet processing device 100 further includes separation claws 116 between the winding roller 109 and the exit roller pair 113. The separation claws 116 are movable in the width direction of the lamination sheet S.

A conveyance sensor C3 that detects the positions of a lamination sheet S and an inner sheet P being conveyed is disposed downstream from the entrance roller pair 108 in the sheet conveyance direction. An abnormality detection sensor C4 that detects the state of the lamination sheet S is disposed downstream from the winding roller 109 in the sheet conveyance direction. A conveyance sensor C5 that detects the position of the lamination sheet S being conveyed is disposed downstream from the exit roller pair 113 in the sheet conveyance direction. A separation sensor C6 that detects the lower side of the separated sheet S is disposed below the conveyance sensor C3. A separation sensor C7 that detects the upper side of the separated sheet S is disposed above the exit roller pair 113.

Here, the conveyance path including the entrance roller pair 108, the winding roller 109, the separation claws 116, and the exit roller pair 113 form a sheet processing path 99 that processes the sheet. Specifically, the sheet processing path 99 is for separating the lamination sheet S as the first sheet and sandwiching, between separated portions of the lamination sheet S, the inner sheet P as the second sheet on which an image is formed by the image forming device 305 disposed upstream from the sheet processing device 100. The sheet processing path 99 may include a heat-pressing roller 120 that is a heat-pressing member capable of heating and pressing the lamination sheet S. With such a configuration, the sheet processing device can perform laminate processing including heating. Thus, another job can be performed using the sheet ejection path during heating, thus enhancing the productivity of the entire system.

The sheet processing device 100 includes a branch claw 118 disposed downstream from the sheet processing path 99 in the conveyance direction and a heat-pressing conveyance path 128 formed downstream from the branch claw 118 in the conveyance direction. The heat-pressing rollers 120 and the ejection roller 121 disposed downstream from the heat-pressing rollers 120 and in the vicinity of a sheet ejection port are disposed on the heat-pressing conveyance path 128.

The heat-pressing roller 120 as a thermal pressing member heats and presses the lamination sheet S with the inner sheet P as a sheet-shaped medium interposed therebetween. The sheet ejected from the sheet ejection port by the ejection roller 121 is ejected and stacked on the ejection tray 104.

Further, the sheet processing device 100 includes a sheet ejection path 124 and a branch claw 119. The sheet ejection path 124 allows a sheet or an inner sheet P, which is a second sheet, to be ejected to the ejection tray 104 without passing through the sheet processing path 99. The branch claw 119 is disposed upstream from the sheet processing path 99 and serves as a switching member to switch the conveyance destination of the sheet or the inner sheet P to the sheet ejection path 124 or the sheet processing path 99 according to information of the sheet or the inner sheet P. Conveyance rollers 125, 127, and 129 that convey a sheet or an inner sheet P and an ejection roller 123 are provided in the sheet ejection path 124. The ejection roller 123 is disposed near the sheet ejection port. The sheet or the inner sheet P ejected from the sheet ejection port by the ejection roller 123 is ejected and stacked on the ejection tray 104.

As described above, the sheet processing device 100 includes the sheet ejection path 124 and the branch claw 119. The sheet ejection path 124 allows a sheet to be ejected without passing through the sheet processing path 99. The branch claw 119 is disposed upstream from the sheet processing path 99 and serves as a switching unit to guide a sheet or an inner sheet P to the sheet ejection path 124. Such a configuration allows the inner sheet P requiring the laminate processing to be guided to the sheet processing path 99 and the sheet not requiring the laminate processing such as copying or printing to be guided to the sheet ejection path 124 and ejected. Accordingly, even during sheet processing such as during the sheet feeding or separating operation of the lamination sheet S in the sheet processing path 99 or during sheet processing such as during the conveyance to the heat-pressing roller 120 after the insertion or sheet processing of the inner sheet P, normal printing (a print job using a copier, a printer, or the like) in which the sheet is ejected without performing the laminate processing can be performed, thus enhancing the productivity of printing that does not require the laminate processing.

The sheet processing device 100 has the branch claw 119 as a switching unit to guide a sheet to the sheet processing path 99 or the sheet ejection path 124 on the upstream side from a conveyance-path merging point of the lamination sheet S as the first sheet and the inner sheet P as the second sheet. Accordingly, even during the feeding of the lamination sheet S in the sheet processing path 99, a sheet subjected to copying or printing that does not require the laminate processing can be guided to the sheet ejection path 124 by the branch claw 119 and ejected to the ejection tray 104.

An operation panel 10 is provided on the exterior of the sheet processing device 100. The operation panel 10 serves as a display-operation device to display information of the sheet processing device 100 and receives input of the operation of the sheet processing device 100. The operation panel 10 also serves as a notification device to output a perceptual signal to a user. As an alternative, a notification device other than the operation panel 10 may be separately provided in the sheet processing device 100.

Each of the entrance roller pair 108 and the exit roller pair 113 is, for example, two rollers paired with each other and driven by a driver such as a motor. A controller 500 causes the driver to control rotations of the entrance roller pair 108 and the exit roller pair 113. The entrance roller pair 108 rotates in one direction. The exit roller pair 113 rotates in forward and reverse directions, thereby nipping and conveying the lamination sheet S and the inner sheet PM.

Figure 2:
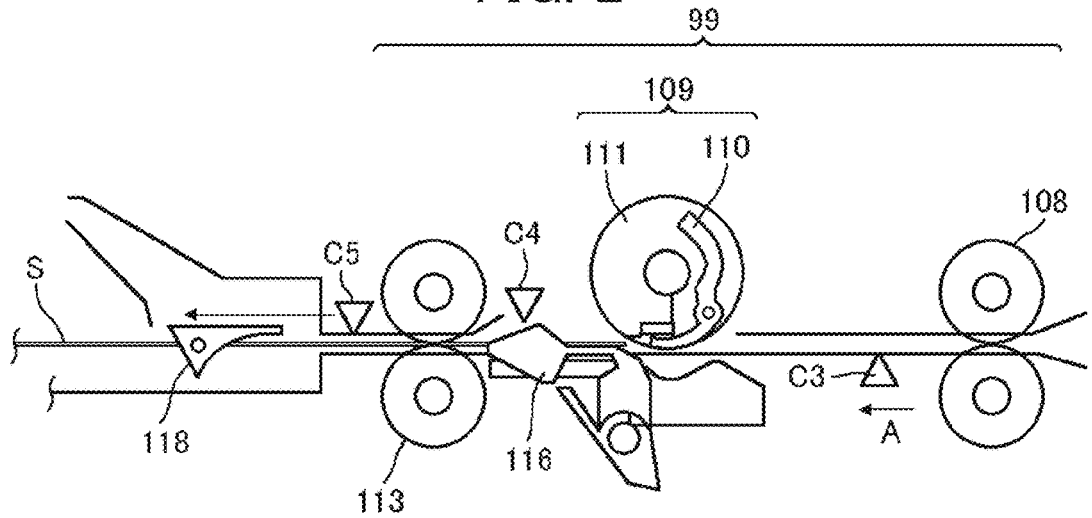
FIG. 2 is a schematic view illustrating a main part of the sheet processing device of FIG. 1.

The entrance roller pair 108 conveys the lamination sheet S and the inner sheet PM toward the exit roller pair 113. The sheet conveyance direction indicated by arrow A in FIG. 2 is referred to as a forward conveyance direction or a direction A.

On the other hand, the exit roller pair 113 is capable of switching the direction of rotation between the forward direction and the reverse direction. The exit roller pair 113 conveys the lamination sheet S nipped by the rollers of the exit roller pair 113 toward the ejection tray 104 (see FIG. 1) in the forward conveyance direction and also conveys the lamination sheet S toward the winding roller 109 in the direction opposite the forward conveyance direction (to convey the lamination sheet S in reverse). The sheet conveyance direction toward the winding roller 109, which is indicated by arrow B in FIG. 3 and a direction opposite to the forward conveyance direction, is referred to as a reverse conveyance direction or a direction B.

The sheet processing device 100 is provided with the winding roller 109 as a rotator and the separation claw 116 that are disposed between the entrance roller pair 108 and the exit roller pair 113. The winding roller 109 is driven by a driver such as a motor to rotate in the forward and reverse directions. The direction of rotation of the winding roller 109 is switchable between the forward direction (clockwise direction) and the reverse direction (counterclockwise direction). The controller 500 causes the driver to control rotations of the winding roller 109 and operations of the separation claws 116.

The winding roller 109 includes a roller 111 and a gripper 110 movably disposed on the roller 111 to grip the lamination sheet S. The movable gripper 110 grips the leading end of the lamination sheet S together with the roller 111. The gripper 110 may be integrated with the outer circumference of the roller 111 or may be a separate component. The controller 500 controls a driver to move the gripper 110.

Next, a description is given of a series of operations performed in the sheet processing device 100, with reference to FIGS. 1 to 12. The series of operations performed by the sheet processing device 100 indicates the operations from separating the lamination sheet S to inserting the inner sheet P into the lamination sheet S. The controller 500 controls the series of operations performed by the sheet processing device 100.

In FIG. 1, the lamination sheet S is loaded on the sheet tray 102 such that a part of the bonded side of the lamination sheet S is located downstream from the pickup roller 105 in the sheet feed direction (sheet conveyance direction). In the sheet processing device 100, the pickup roller 105 picks up the lamination sheet S from the sheet tray 102, and the conveyance roller pair 107 conveys the lamination sheet S toward the entrance roller pair 108.

Next, the entrance roller pair 108 conveys the lamination sheet S toward the winding roller 109. In the sheet processing device 100, the entrance roller pair 108 conveys the lamination sheet S with the bonded end, which is one of four sides of the lamination sheet S, as the downstream side in the forward conveyance direction A as indicated by arrow A in FIG. 2.

FIG. 2 is a schematic view illustrating a main part of the sheet processing device of FIG. 1. Subsequently, as illustrated in FIG. 2, the sheet processing device 100 temporarily stops conveyance of the lamination sheet S when the trailing end of the lamination sheet S in the forward conveyance direction has passed the winding roller 109. That is, the controller 500 receives a trigger signal from the conveyance sensor C3 when the conveyance sensor C3 detects the leading end of the lamination sheet S and controls the rotations of the entrance roller pair 108 and the exit roller pair 113 to convey the lamination sheet S by a designated amount from the conveyance sensor C3.

Figure 3:
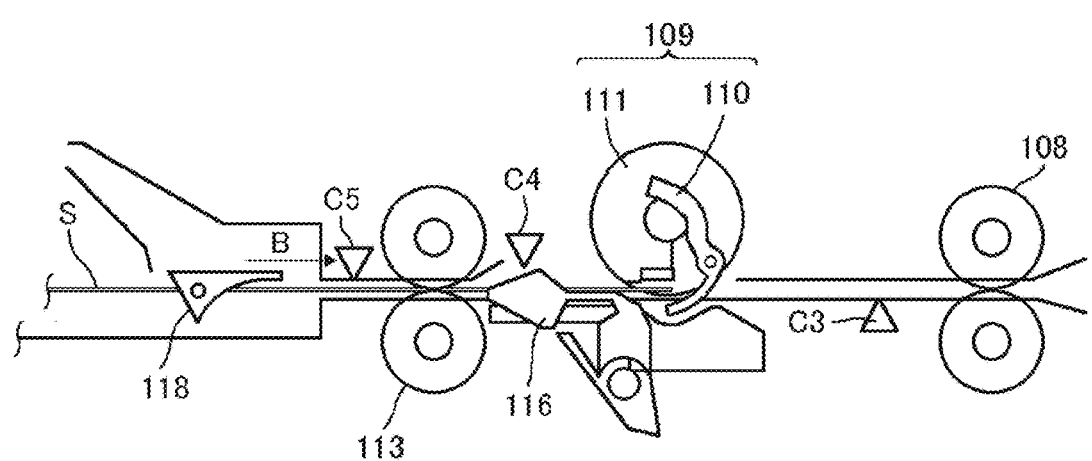
FIG. 3 is a schematic view illustrating the main part of the sheet processing device in a state subsequent to the state in FIG. 2.

Next, as illustrated in FIG. 3, the controller 500 causes the gripper 110 to open and the exit roller pair 113 to rotate in the reverse direction to convey the lamination sheet S in the reverse conveyance direction (sheet conveyance direction B) toward the opened portion of the gripper 110.

Figure 4:
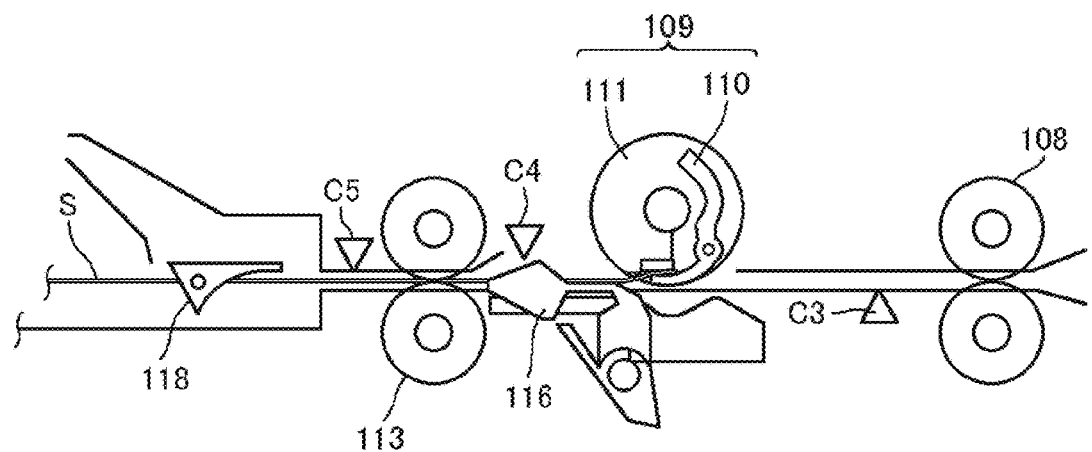
FIG. 4 is a schematic view illustrating the main part of the sheet processing device in a state subsequent to the state in FIG. 3.

Subsequently, as illustrated in FIG. 4, the controller 500 causes the exit roller pair 113 to stop rotating to stop conveyance of the lamination sheet S when the end of the lamination sheet S is inserted into the opened portion of the gripper 110 and causes the driver to close the gripper 110 to grip the end of the lamination sheet S. Specifically, the gripper 110 is configured to sandwich and grip the lamination sheet S with a receiving portion 115 of the winding roller 109 from a direction perpendicular to the end portion of the lamination sheet S. The receiving portion 115 is formed so as to face the gripper 110. Note that these operations are performed when the lamination sheet S is conveyed by the specified amount.

Here, in the present embodiment, at least one of the gripper 110 and the receiving portion 115 is formed of an elastic material such as rubber, a spring, or a leaf spring. As compared with a configuration in which the gripper 110 and the receiving portion 115 have rigid bodies made of metal or resin, such a configuration can enhance the gripping force to grip the lamination sheet S and prevent the surfaces of the lamination sheet S from being damaged. In particular, when both the gripper 110 and the receiving portion 115 are made of an elastic material, such an effect is likely to be exhibited.

Figure 5:
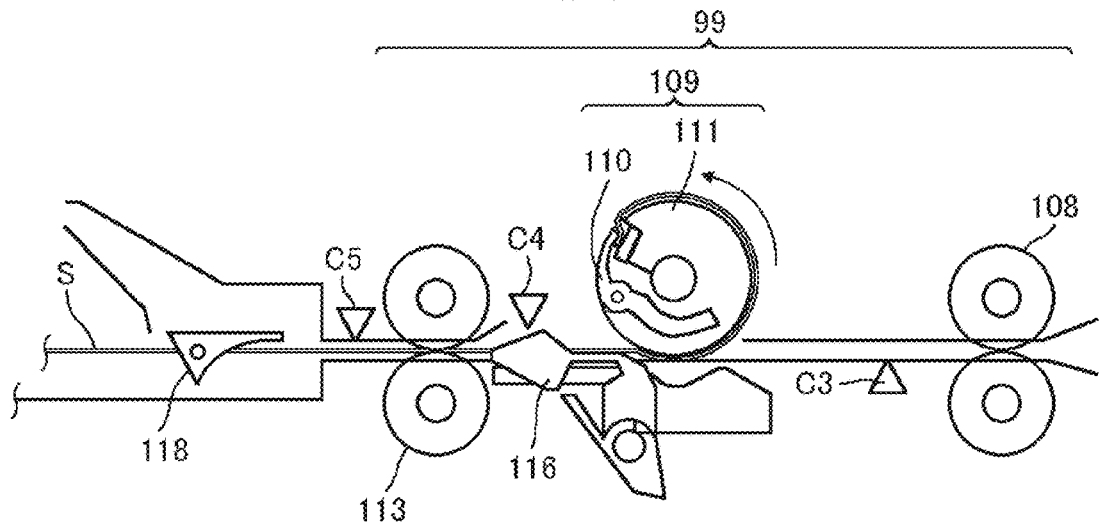
FIG. 5 is a schematic view illustrating the main part of the sheet processing device in a state subsequent to the state in FIG. 4.

Then, as illustrated in FIG. 5, the controller 500 causes the driver to rotate the winding roller 109 in the counterclockwise direction in FIG. 6 to wind the lamination sheet S around the winding roller 109. Here, the lamination sheet S is wound around the winding roller 109 from the side where the two sheets of the lamination sheet S are overlapped but not bonded.

The winding roller 109 is rotatable about a rotary shaft 112 in the forward direction and in the reverse direction. The controller 500 controls a drive motor that drives the winding roller 109.

Figure 6A:
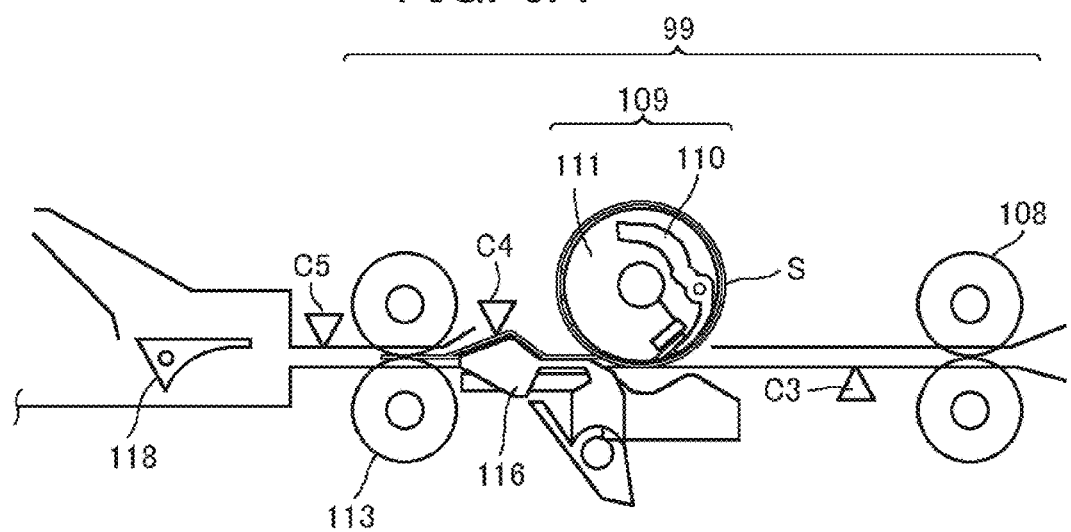
FIG. 6A is a schematic view of the main part of the sheet processing device in a state subsequent to the state in FIG. 5.
Figure 6B:
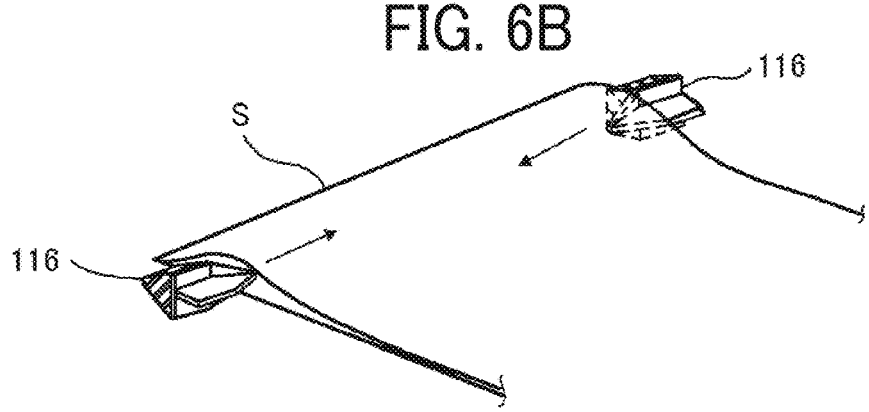
FIG. 6B is a perspective view of the main part of the sheet processing device in the state in FIG. 6A.

FIG. 6A is a side view of separation claws inserted in a sheet S. FIG. 6B is a perspective view of the separation claws inserted in the lamination sheet S. As illustrated in FIGS. 6A and 6B, when the lamination sheet S that is the two-ply sheet is wound around the winding roller 109, a winding circumferential length difference is created between the two sheets in the amount of winding of the lamination sheet S around the circumference of the winding roller 109. There is a surplus of the sheet on the inner circumferential side to the center of the winding roller 109, which generates a slack toward the bonded end. As a result, a space is created between the two sheets constructing the two-ply sheet. As the separation claws 116 are inserted into the space generated as described above, from both sides of the lamination sheet S, the space between the two sheets is reliably maintained. Note that these operations are performed by conveying the lamination sheet S from the sheet sensor C5 by a specified amount in response to the timing at which the sheet sensor C5 detected the leading end of the lamination sheet S.

Figure 7A:
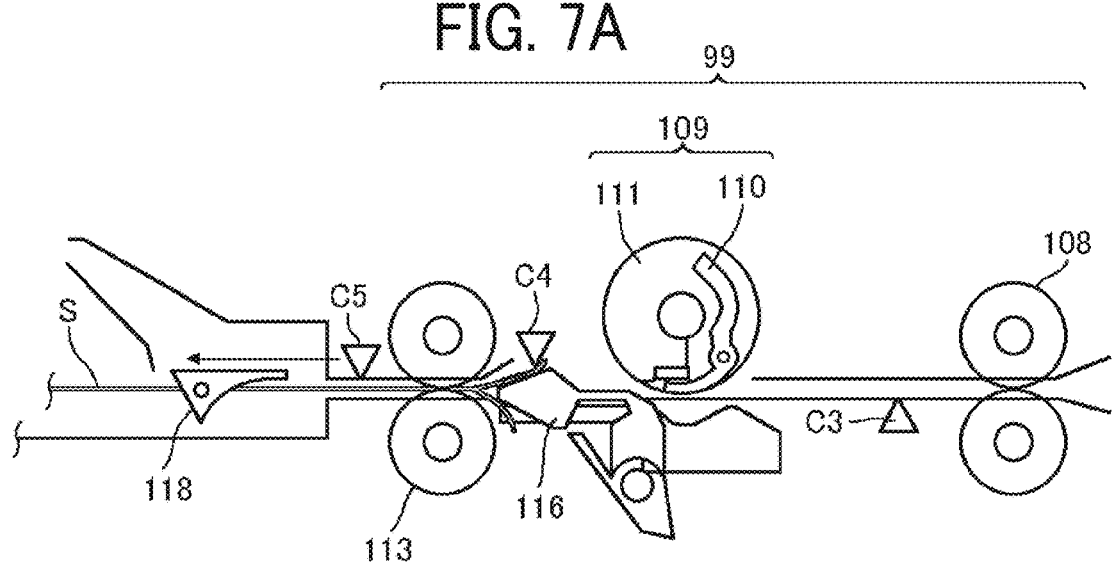
FIG. 7A is a schematic view illustrating the main part of the sheet processing device in a state subsequent to the state in FIG. 6A.
Figure 7B:
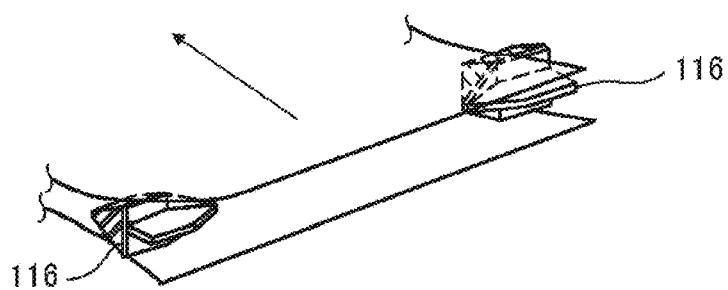
FIG. 7B is a perspective view of the main part of the sheet processing device in the state in FIG. 7A.

With the separation claws 116 inserted in the space in the lamination sheet S, the controller 500 causes the driver to rotate the winding roller 109 in the clockwise direction (see FIG. 6A). The controller 500 then causes the space generated in the lamination sheet S to shift to the trailing end of the lamination sheet S in the forward conveyance direction (sheet conveyance direction A), as illustrated in FIGS. 7A and 7B. After the winding roller 109 has been rotated by a specified amount, the controller 500 causes the driver to open the gripper 110. As a result, the trailing end of the lamination sheet S is separated into the upper and lower sheets.

In this state, the controller 500 causes the driver to temporarily stop the conveyance of the lamination sheet S and to further move the separation claws 116 in the width direction of the lamination sheet S to separate the whole area of the trailing end of the lamination sheet S. Note that these operations are performed by conveying the lamination sheet S from the sheet sensor C5 by a specified amount in response to the timing at which the sheet sensor C5 detected the leading end of the lamination sheet S.

FIG. 7B is a perspective view illustrating the separation claws 116 and the lamination sheet S in the state of FIG. 7A. Since each separation claw 116 further has a branching guide that functions as a guide to guide the two sheets separated from the lamination sheet S in different directions due to the above-described shape, the two sheets separated from the lamination sheet S may be kept in postures to be conveyed to different sheet conveyance passages.

Figure 8:
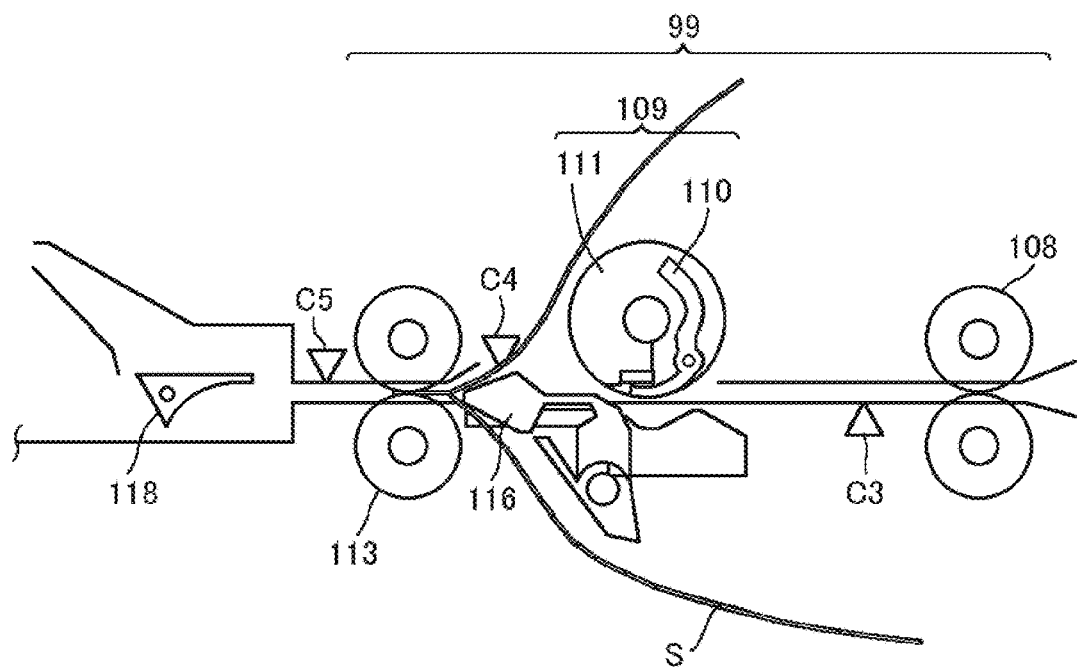
FIG. 8 is a schematic view illustrating the main part of the sheet processing device in a state subsequent to the state in FIG. 7A.

Next, as illustrated in FIG. 8, after the separation claws 116 have separated the whole area of the trailing end of the lamination sheet S, the controller 500 causes the driver to rotate the exit roller pair 113 in the counterclockwise direction in FIG. 59 to convey the lamination sheet S in the reverse conveyance direction (sheet conveyance direction B). That is, the separation claws 116 guide the two sheets separated from the lamination sheet S in the upper and lower directions, respectively, and therefore the two sheets are fully separated.

The controller 500 causes the driver to temporarily stop the conveyance of the lamination sheet S, so that the bonded portion of the lamination sheet S is held (nipped) by the exit roller pair 113. Accordingly, one end of the lamination sheet S is bonded as the bonded side of the lamination sheet S and the other end of the lamination sheet S is opened largely. The series of operations described above is the separating operation.

Note that these operations are performed by conveying the lamination sheet S from the sheet sensor C5 by a specified amount in response to the timing at which the sheet sensor C5 detected the leading end of the lamination sheet S.

Figure 9:
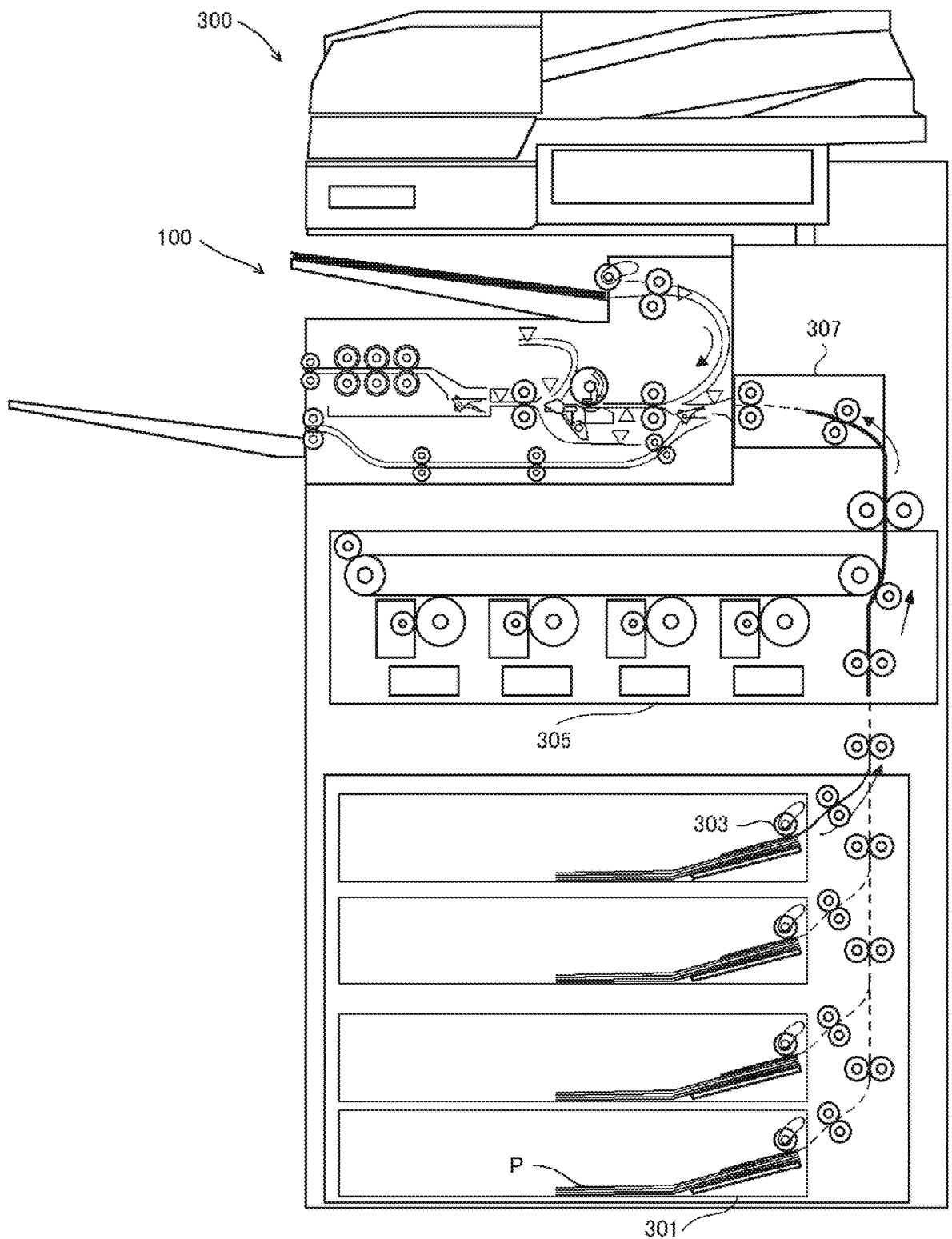
FIG. 9 is a schematic diagram of a configuration of an image forming apparatus provided with the sheet processing device illustrated in FIG. 1, according to an embodiment of the present disclosure.

FIG. 9 is a schematic diagram of a configuration of an image forming apparatus provided with the sheet processing device illustrated in FIG. 1, according to an embodiment of the present disclosure. The image forming apparatus 300 according to the present embodiment includes the sheet feeding unit 301, a sheet feeder 303, the image forming device 305, and the sheet ejection path 307. The sheet feeding unit 301 is disposed in a lower portion of the apparatus to accommodate and feed an inner sheet P. The sheet feeder 303 feeds the inner sheet P from the sheet feeding unit 301. The image forming device 305 is disposed above the sheet feeding unit 301 and forms an image on the inner sheet P. The sheet ejection path 307 ejects the inner sheet P on which the image has been formed. The inner sheet P conveyed through the image forming apparatus 300 is delivered into the sheet processing device 100 by the inner-sheet delivery guide 117 of the sheet processing device 100 disposed downstream from the image forming apparatus 300.

After the separating operation in FIG. 8 is finished, as illustrated in FIG. 9, the inner sheet P is fed from the image forming apparatus 300. The inner sheet P is fed from the sheet feeding unit 301 of the image forming apparatus 300 and is delivered from the sheet ejection path 307 to the inner-sheet delivery guide 117 of the sheet processing device 100. At this time, the image forming device 305 may form an image on the inner sheet P.

The image forming apparatus illustrated in FIG. 9 may include a body sheet-ejection path and a body sheet-ejection tray above the sheet ejection path 307. Accordingly, even when the laminate processing is not performed, the sheet can be ejected from the image forming apparatus 300. With such a configuration, when the image forming apparatus 300 performs output that does not require laminate processing in the setting illustrated in FIG. 13, the sheet can be ejected without passing through the laminate processing unit, and thus the sheet can be ejected without losing the output speed of the body of the image forming apparatus.

As illustrated in FIG. 1, at least the sheet processing path 99 is configured to be attachable to and detachable from the image forming apparatus 300, so that the sheet processing device 100 can be configured to perform separation of a laminate film or laminate processing without the image forming apparatus 300.

Figure 10:
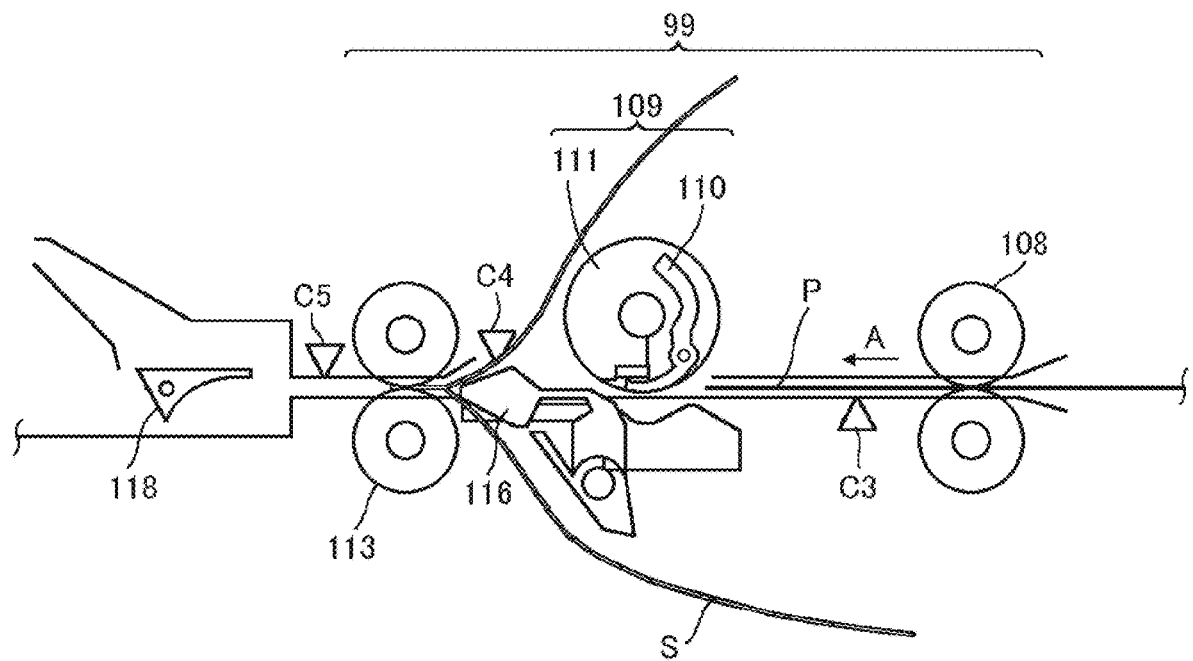
FIG. 10 is a schematic view illustrating the main part of the sheet processing device in a state subsequent to the state in FIG. 9.

Next, as illustrated in FIG. 10, the sheet processing device 100 rotates the entrance roller pair 108 and directs the insertion sheet P conveyed from the sheet feeding tray 103 (see FIG. 1) toward the exit roller pair 113 in the forward conveyance direction (or the direction A).

Figure 11:
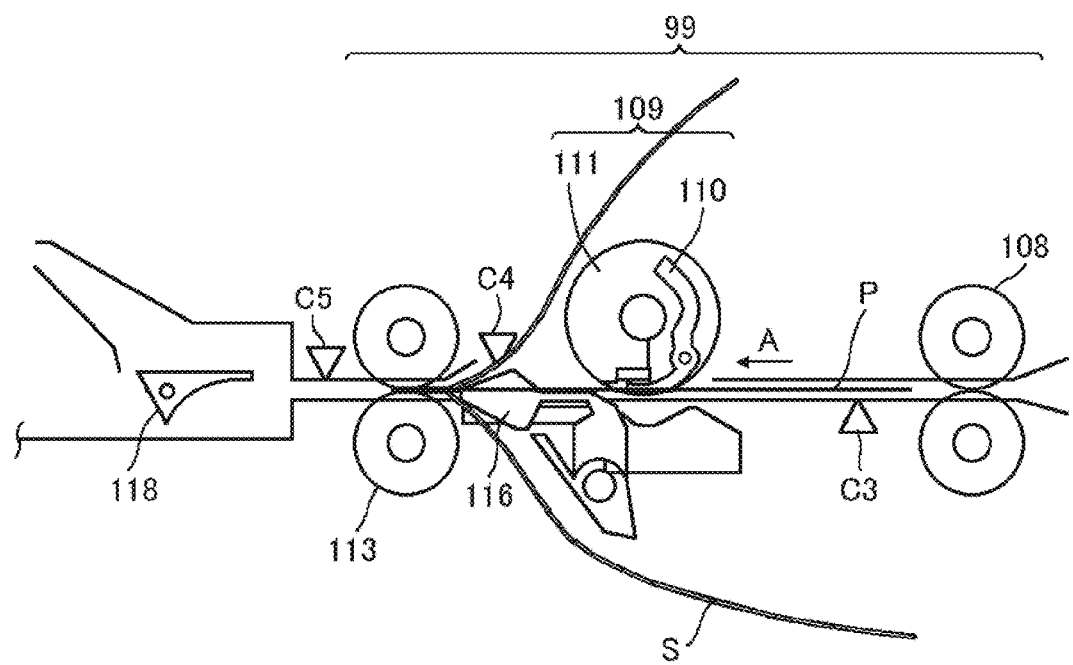
FIG. 11 is a schematic view illustrating the main part of the sheet processing device in a state subsequent to the state in FIG. 10.

Subsequently, as illustrated in FIG. 11, the controller 500 causes the exit roller pair 113 to rotate so that the lamination sheet S and the inner sheet P meet to insert the inner sheet P into the lamination sheet S from the open portion (on the other end) of the lamination sheet S.

Figure 12:
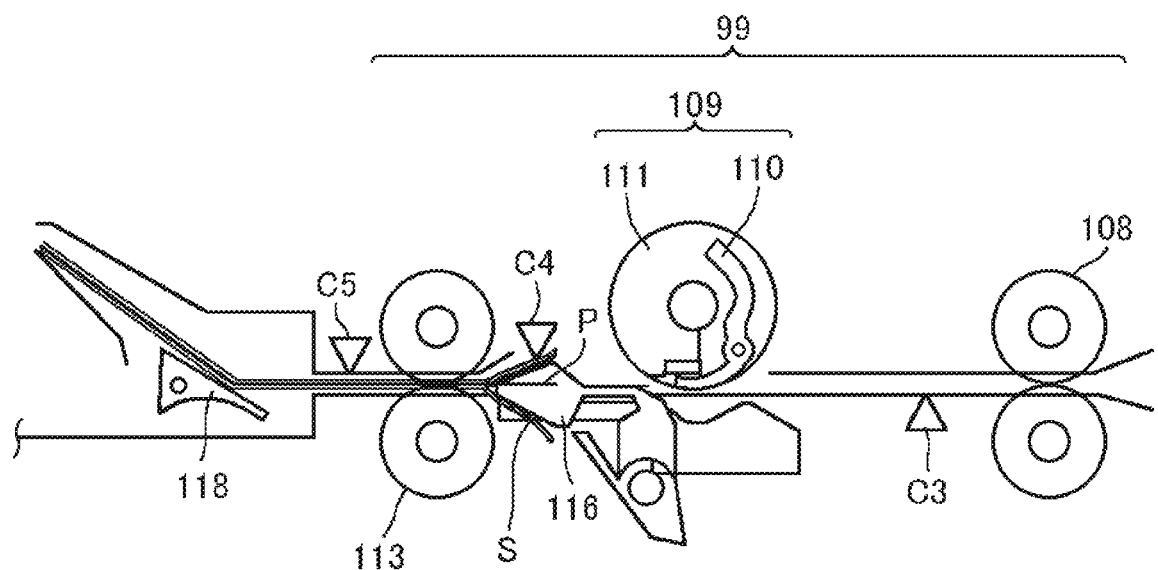
FIG. 12 is a schematic view illustrating the main part of the sheet processing device in a state subsequent to the state in FIG. 11.

Then, as illustrated in FIG. 12, the exit roller pair 113 of the sheet processing device 100 conveys the lamination sheet S in which the inner sheet P is inserted, in the forward conveyance direction (sheet conveyance direction A). Thus, the two sheets of the lamination sheet S are overlapped one on another again so as to close the open portion of the lamination sheet S. The lamination sheet S in which the inner sheet P is sandwiched is conveyed to the heat-pressing conveyance path 128 leading to the heat pressing device by, for example, the exit roller pair 113, the branch claw 118, and the rollers disposed downstream from the branch claw 118. The operations from the state illustrated in FIG. 1 to the state illustrated in FIG. 12 are the sheet feeding and separating operation of the lamination sheet S, the inner-sheet inserting operation, and the conveying operation of the lamination sheet S into which the inner sheet P is inserted to the heat-pressing conveyance path 128.

As described above, the controller 500 according to the present embodiment causes the driver to open the lamination sheet S so as to insert and nip the inner sheet P into the lamination sheet S. Accordingly, since the configuration of the sheet processing device 100 is simpler than the configuration of a known sheet laminator employing a vacuum device, the entire sheet processing device has a simpler and smaller configuration.

Figure 13:
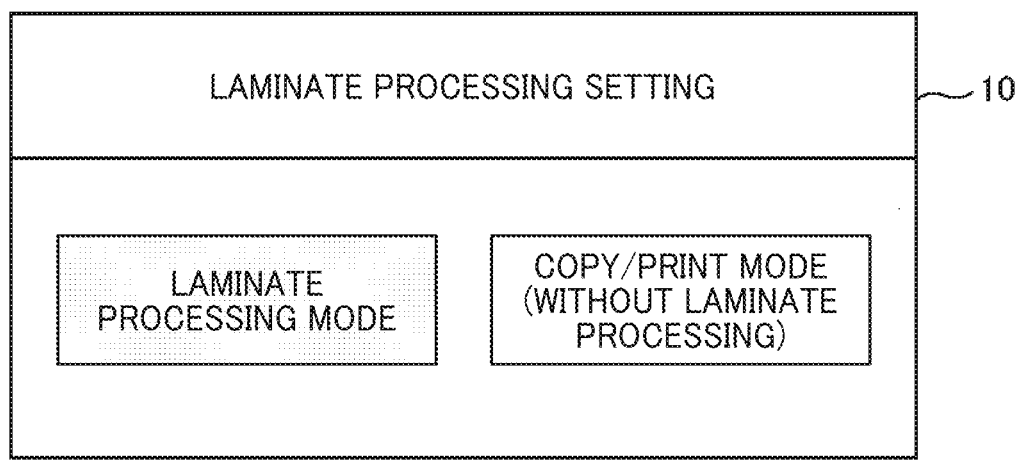
FIG. 13 is a diagram illustrating an operation panel provided in a sheet processing device according to an embodiment of the present disclosure.

FIG. 13 is a diagram illustrating an example of the operation panel 10 installed in the sheet processing device 100. The user can select, using the operation panel 10, whether to perform laminate processing and eject a sheet (laminate processing mode) or to perform normal printing without performing laminate processing and eject a sheet (copy/print mode). When the copy/print mode is selected, the sheet is conveyed through and ejected from the sheet ejection path 124. Providing such a user interface in the sheet processing device 100 allows the user to select the normal print mode or the laminate processing mode. When the normal print mode is selected, the sheet can be ejected to the ejection tray 104 without passing through the sheet processing path 99.

Here, setting sheet information indicating whether to perform the laminate processing on each sheet before starting the print job allows determination on whether to perform the laminate processing in association with the sheet received by the sheet processing device 100 when receiving the sheet.

Although the operation panel 10 is used as an example in the present embodiment, the laminate processing mode and the copy/print mode may be switched by a printer driver, a switch, or the like.

Therefore, the sheet processing device 100 switches the branch claw 119 in accordance with the information of the sheet delivered from the image forming apparatus 300 to the sheet processing device 100, more specifically, in accordance with whether the laminate processing (sheet processing) is to be performed on the sheet or the delivered sheet is the inner sheet P to be sandwiched between separated portions of the lamination sheet S or the copy/print mode is performed or the sheet is not to be sandwiched between the separated portions of the lamination sheet S.

Figure 14:
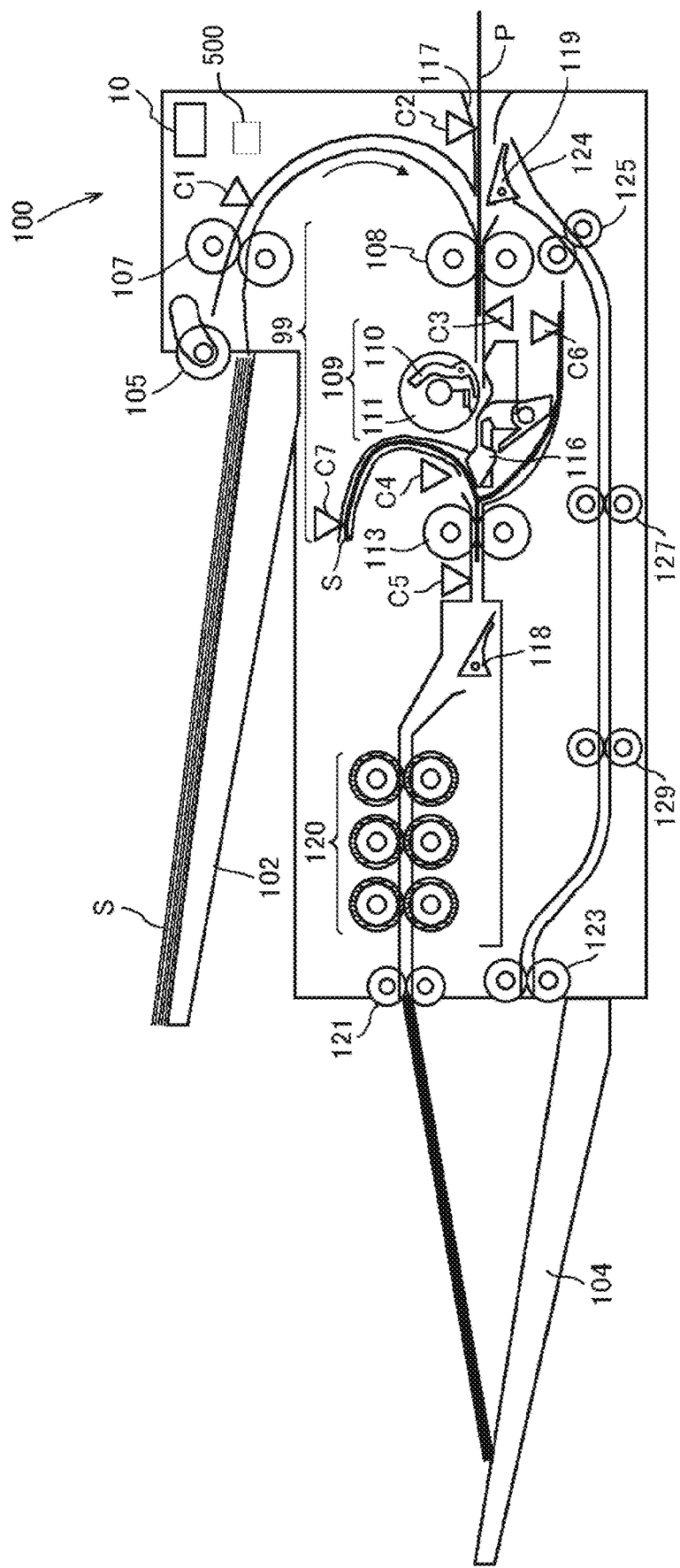
FIG. 14 is a side view of the sheet processing device of FIG. 1 in a state different from the state illustrated in FIG. 1.

Sheet to be laminated FIG. 14 is a side view of the sheet processing device 100 of FIG. 1 in another state different from the state illustrated in FIG. 1. When the user selects the "laminate processing mode" from the operation panel 10 illustrated in FIG. 13 to perform the laminate processing (sheet processing) or when the sheet is the inner sheet P to be sandwiched between the separated sheets S, the sheet processing device 100 switches the branch claw 119 to the lower position as illustrated in FIG. 14 to guide the inner sheet P to be inserted into the lamination sheet S to the sheet processing path 99. Next, the lamination sheet S in which the inner sheet P is inserted is conveyed to the heat-pressing rollers 120, is subjected to the laminate processing, is conveyed by the ejection roller 121, and is ejected to the ejection tray 104.

Figure 15:
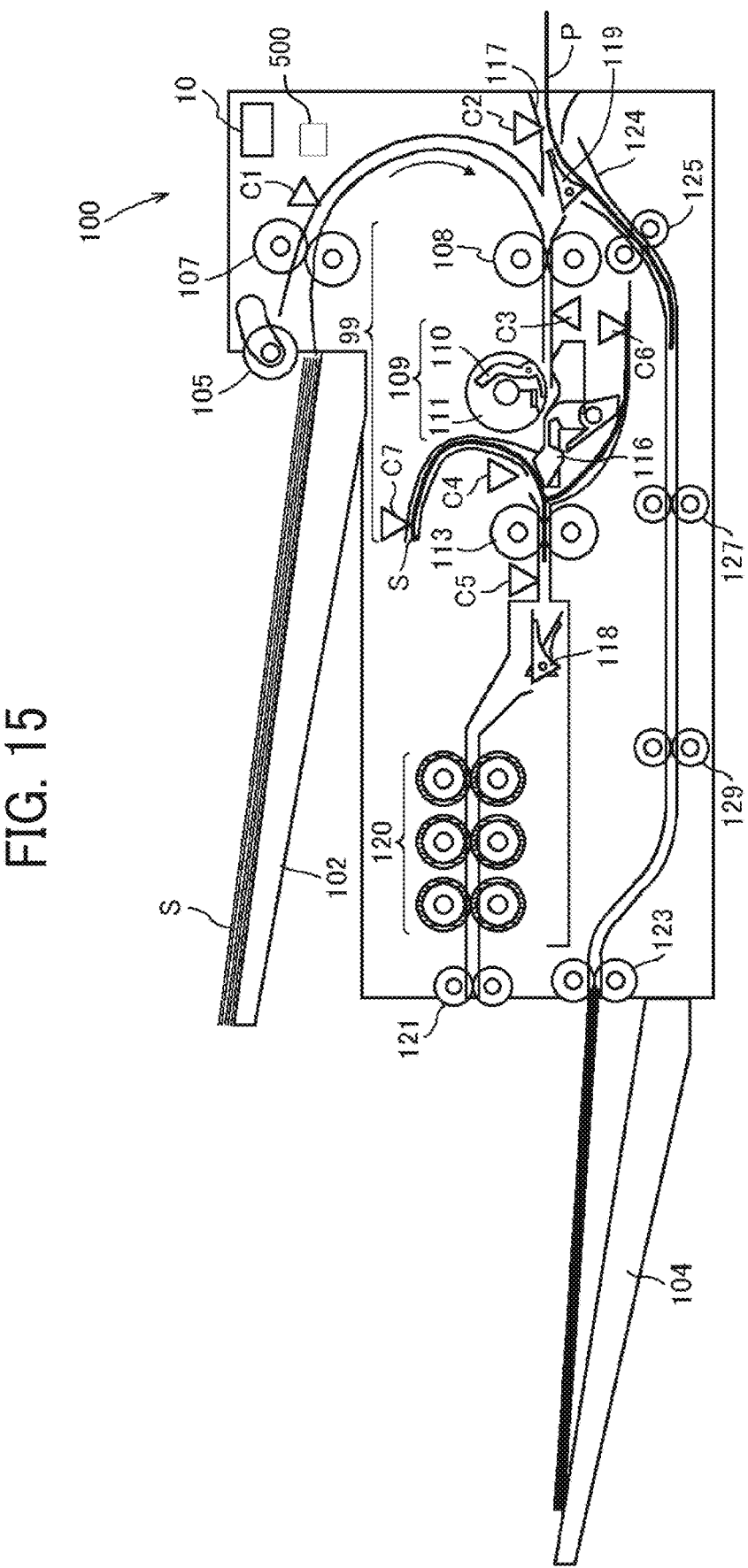
FIG. 15 is a side view of the sheet processing device of FIG. 1 in a state different from the state illustrated in FIG. 1.

Sheet not to be laminated FIG. 15 is a side view of the sheet processing device 100 of FIG. 1 in still another state different from the state illustrated in FIG. 1. When the user selects the "copy/print mode" from the operation panel 10 illustrated in FIG. 13 and the laminate processing (sheet process) is not performed or the sheet is not sandwiched between separated portions of the lamination sheet S, the sheet processing device 100 switches the branch claw 119 to the upper position as illustrated in FIG. 15 and guides the sheet delivered from the image forming apparatus 300 to the sheet ejection path 124. Next, the sheet is conveyed in the sheet ejection path 124 by the conveyance rollers 125, 127, and 129 and the ejection roller 123, and is ejected to the same ejection tray 104 as the lamination sheet S conveyed through the sheet processing path 99 and the heat-pressing conveyance path 128.

As described above, providing the sheet ejection path 124 that does not pass through the sheet processing path 99 allows the sheet not subjected to the laminate processing or the inner sheet P to be ejected even during the sheet processing operation of the sheet processing device 100.

When there is an output that does not require laminate processing during the basic separating operation of the lamination sheet S (other than the feeding operation of the inner sheet P from the image forming apparatus 300 after the end of the separating operation) and the conveying operation to the heat-pressing roller 120, the sheet can be guided to the sheet ejection path 124 by switching the branch claw 119 and ejected to the ejection tray 104 by the ejection roller 123.

When an instruction to form an image on a sheet not to be sandwiched in the lamination sheet S is issued during processing of the lamination sheet S in the sheet processing path 99, the sheet processing device 100 forms an image on a sheet not to be sandwiched in the lamination sheet S before forming an image on the inner sheet P to be sandwiched in the lamination sheet S, and guides the sheet on which the image has been formed to the sheet ejection path 124. Accordingly, even during the laminate processing of the lamination sheet S in the sheet processing path 99, before the printing instruction of the inner sheet P is issued in the laminate processing, an output material that does not require the laminate processing such as copying or printing can be printed and output from the sheet processing device 100.

When an instruction to form an image on a sheet not to be nipped by the lamination sheet S is issued during processing of the lamination sheet S and the inner sheet P to be nipped by the lamination sheet S in the sheet processing path 99, the sheet processing device 100 forms an image on the sheet not to be nipped by the lamination sheet S and guides the sheet on which the image has been formed to the sheet ejection path 124. Accordingly, when normal printing (copying, printing, or the like) is instructed during the insertion of the inner sheet P into the lamination sheet S in the sheet processing path 99 or sheet ejection operation, the sheet printed by the normal printing instruction is guided to the sheet ejection path 124, thus enhancing the productivity of the normal printing.

Figure 16:
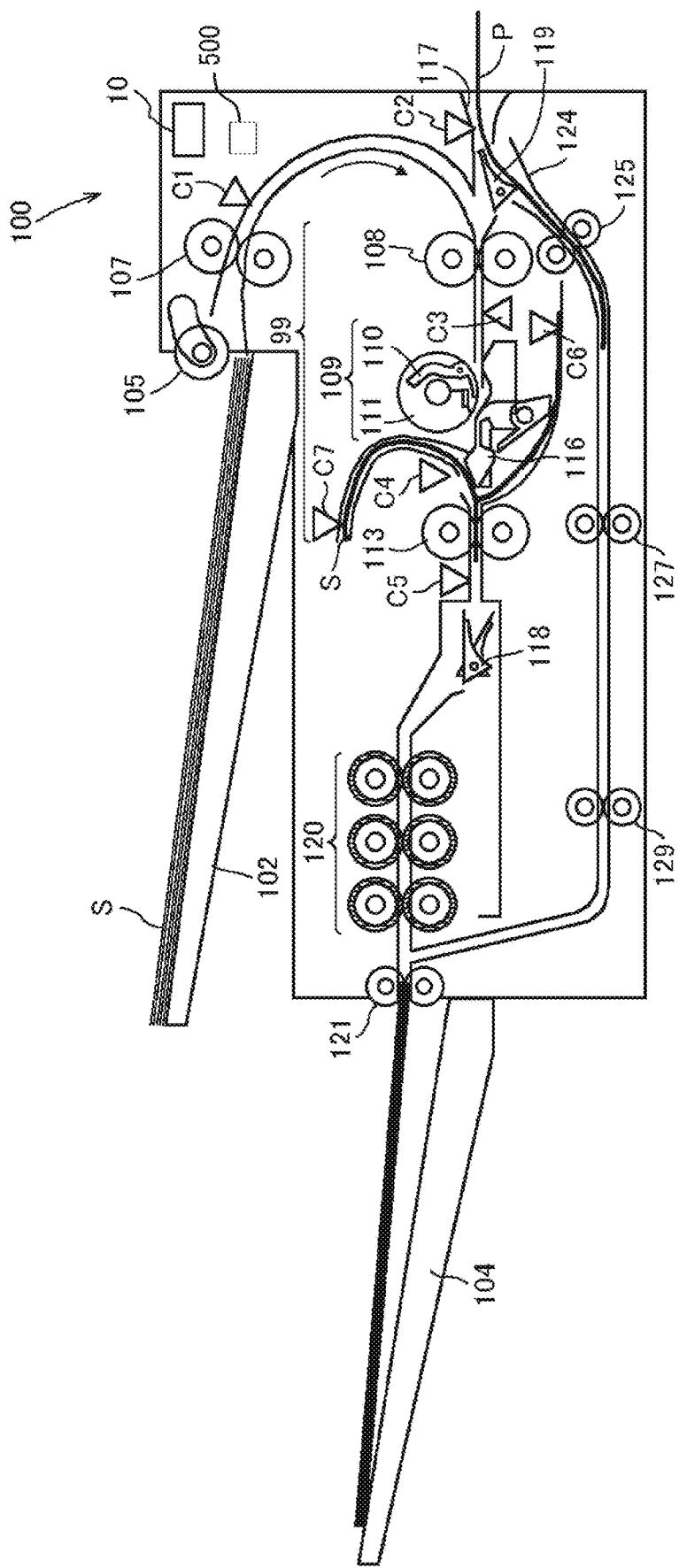
FIG. 16 is a schematic view illustrating the overall configuration of a sheet processing device according to an embodiment of the present disclosure.

Next, a description is given of a sheet processing device according to another embodiment of the present disclosure, with reference to FIG. 16. FIG. 16 is a schematic view illustrating the overall configuration of a sheet processing device according to another embodiment of the present disclosure. The sheet processing device 100 includes a sheet ejection path 124 that allows a sheet to be ejected to an ejection tray 104 without passing through a sheet processing path 99, and a branch claw 119 serving as a switching member to switch a conveyance destination of a sheet or an inner sheet P to the sheet ejection path 124 or the sheet processing path 99 upstream from the sheet processing path 99. Conveyance rollers 125, 127, and 129 that convey a sheet are disposed in the sheet ejection path 124. A conveyance path downstream from the branch claw 119 is branched into a path including the sheet processing path 99 and the sheet ejection path 124, which merge again upstream from the ejection roller 121.

Accordingly, the sheet (inner sheet P) conveyed through the sheet processing path 99 and the sheet (sheet) conveyed through the sheet ejection path 124 are ejected to the common ejection tray 104 by the ejection roller 121. Thus, the sheet processing device 100 can be reduced in size and space.

In the configuration of the sheet processing device 100 illustrated in FIG. 14, when the lamination sheet S is ejected from the conveyance path formed above the sheet processing device 100, the distance to the ejection tray 104 is large, so that the lamination sheet S stacked on the ejection tray 104 might be disturbed. However, the configuration of the sheet processing device 100 illustrated in FIG. 16 can ensure a stable stacking performance even when the sheet is ejected from any of the sheet processing path 99 and the sheet ejection path 124.

Figure 17:
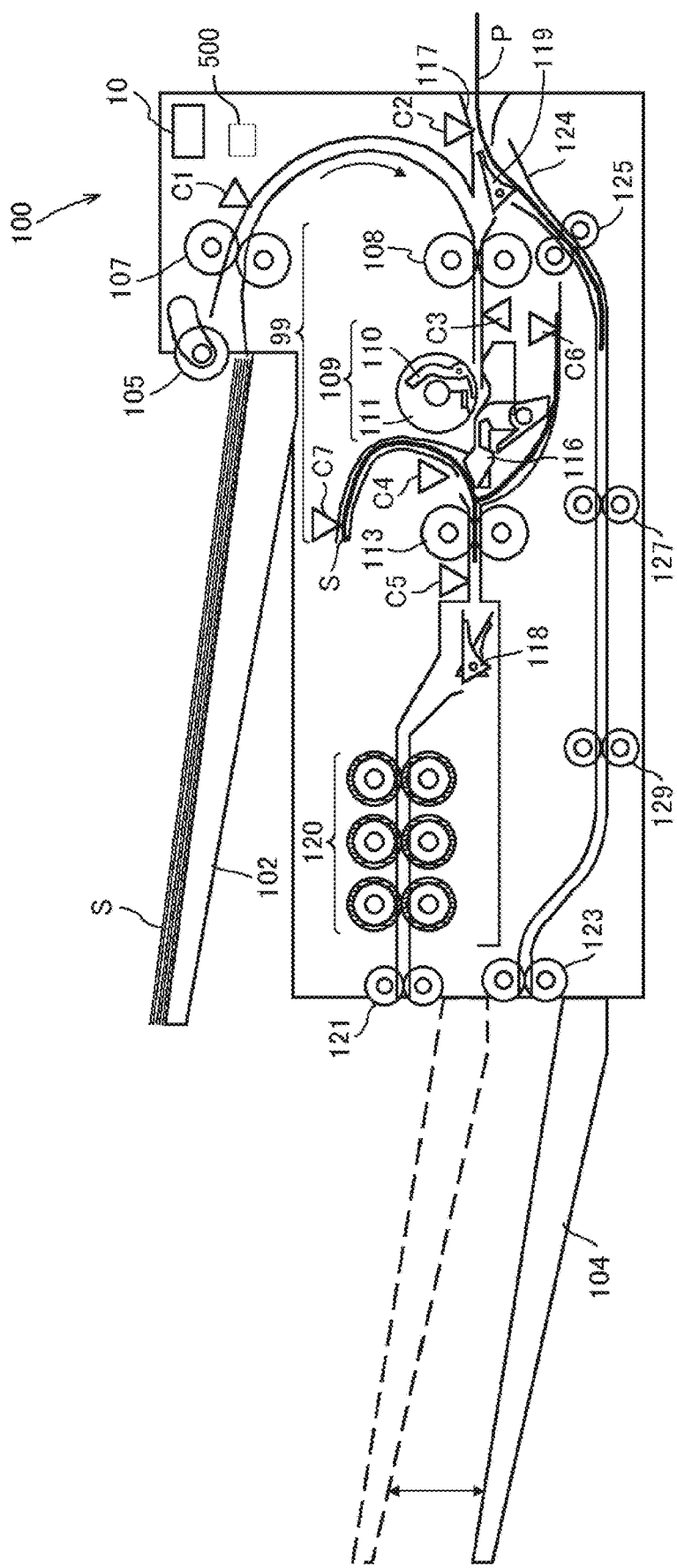
FIG. 17 is a schematic view illustrating the overall configuration of a sheet processing device according to an embodiment of the present disclosure.

Next, a description is given of a sheet processing device according to according to still yet another embodiment of the present disclosure, with reference to FIG. 17. FIG. 17 is a schematic view illustrating the overall configuration of a sheet processing device according to still yet another embodiment of the present disclosure. In the sheet processing device 100 according to the present embodiment, similarly to the sheet processing device illustrated in FIGS. 1, 14, and 15, a sheet conveying path is branched into a fixing path and a non-fixing path at a position where the branch claw 119 is disposed, and the sheet is ejected to the ejection tray 104 as it is. However, the ejection tray 104 is configured to be vertically movable. With such a configuration, the distance to the ejection tray 104 does not increase regardless of which conveyance path the lamination sheet S is ejected from. Thus, stable stackability can be ensured.

Figure 18A:
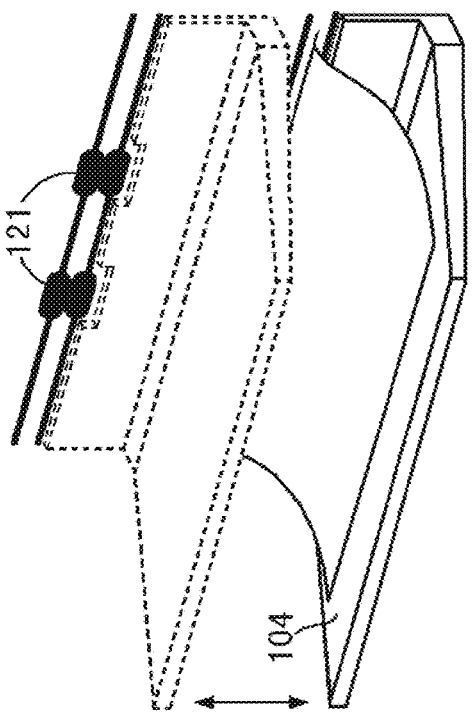
FIGS. 18A and 18B are perspective views of a sheet ejection portion of the sheet processing device illustrated in FIG. 17.
Figure 18B:
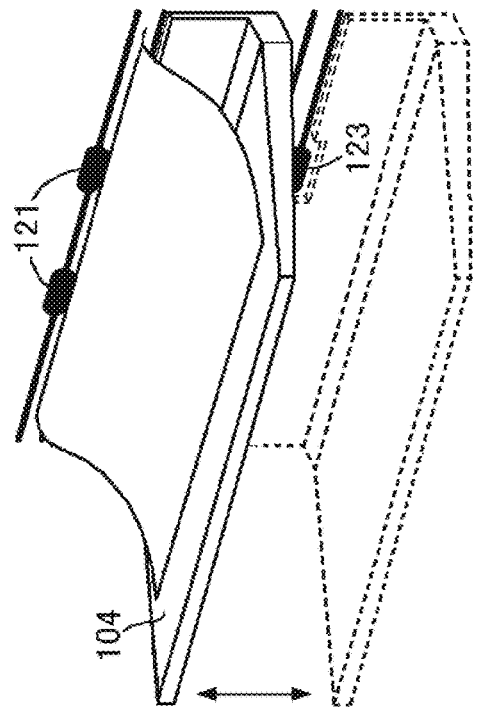

FIGS. 18A and 18B are perspective views of a sheet ejection portion of the sheet processing device 100 illustrated in FIG. 17. As illustrated in FIG. 18A, when a sheet is conveyed through the sheet ejection path 124, the ejection tray 104 moves to a lower position to receive the sheet. As illustrated in FIG. 18B, when the lamination sheet S is conveyed through a path including the sheet processing path 99, the ejection tray 104 moves to an upper position to receive the lamination sheet S subjected to the heat pressing.

Figure 19:
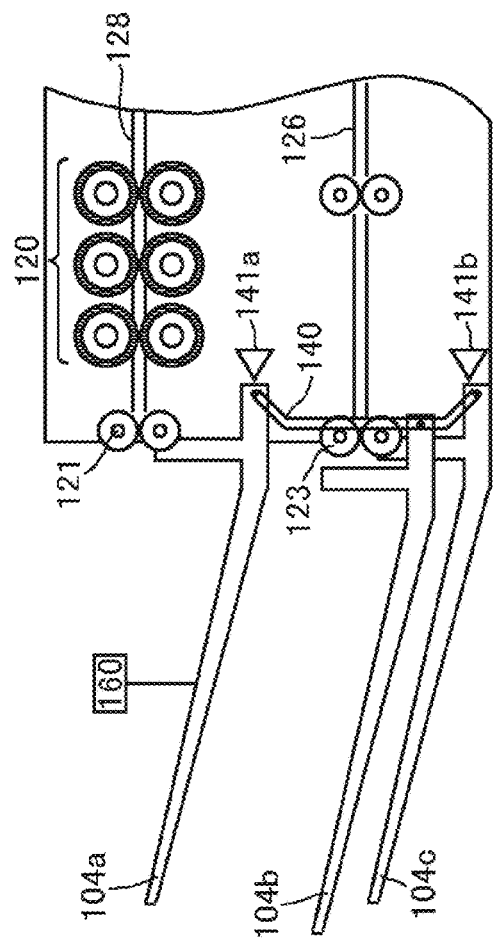
FIG. 19 is a schematic side view illustrating a lift that raises and lowers an ejection tray.

FIG. 19 is a schematic side view of a lift that raises and lowers the ejection tray 104. When the ejection tray 104 moves up and down as illustrated in FIGS. 18A and 18B, the ejection tray 104 might interfere with the ejection rollers 121 and 123. For this reason, the sheet processing device 100 includes a lift that raises and lowers the ejection tray 104, and the ejection tray 104 is raised and lowered by the lift according to the conveyance path through which the lamination sheet S, a sheet of paper, or the inner sheet P is conveyed. Thus, the lamination sheets S, sheets of paper, or the inner sheets P ejected from any of the non-heat-pressing conveyance path 126 and the heat-pressing conveyance path 128 are stacked in the same manner, thus stabilizing the stack quality.

As illustrated in FIG. 19, the lift that raises and lowers the ejection tray 104 includes a guide rail 140 and a traction member 160. The guide rail 140 guides the ejection tray 104 up, down, left, and right. The traction member 160 made of a belt, a wire, or the like connected to the ejection tray 104 to pull the ejection tray 104. The guide rail 140 has a body extending in the vertical direction and a leading end portion extending obliquely from the body. Since the ejection tray 104 can be moved not only in the vertical direction but also in the sheet conveyance direction by the guide rail 140, the ejection tray 104 can avoid the ejection rollers 121 and 123 when the ejection tray 104 moves up and down. In FIG. 19, an ejection tray 104a indicates an upper position (corresponding to a sheet ejection port of the laminate processing path) at which the ejection tray 104 is engaged with an upper leading-end portion of the guide rail 140. The ejection tray 104c indicates a lower position (corresponding to a sheet ejection port of the sheet ejection path) at which the ejection tray 104 is engaged with a lower leading-end portion of the guide rail 140. The ejection tray 104b indicates an intermediate position at which the ejection tray 104 is within a body of the guide rail 140 and is between the upper position and the lower position. The upper position indicated by the ejection tray 104a is detected with a sensor 141a, and the lower position indicated by the ejection tray 104c is detected with a sensor 141b.

Figure 20:
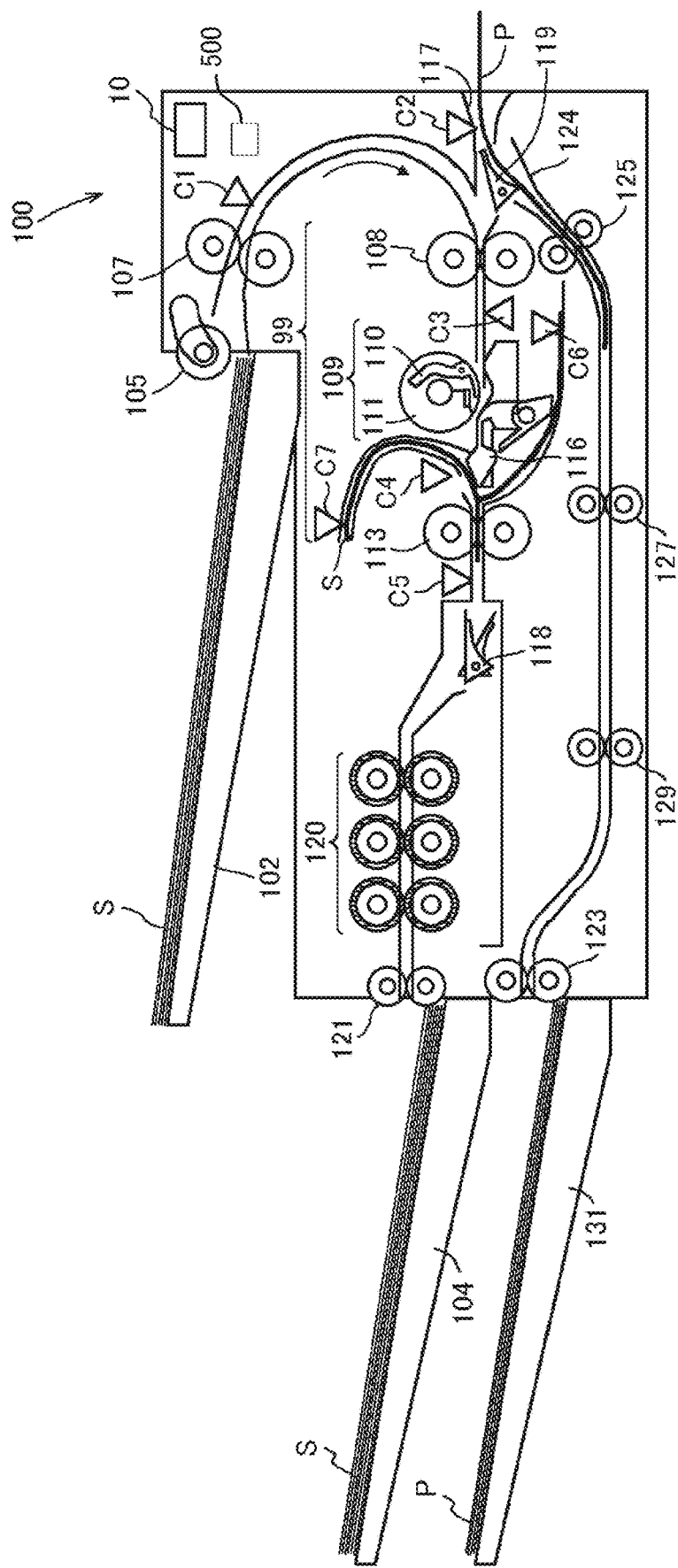
FIG. 20 is a schematic view illustrating an overall configuration of a sheet processing device according to an embodiment of the present disclosure.

Next, a description is given of a sheet processing device according to according to still yet further another embodiment of the present disclosure, with reference to FIG. 20. FIG. 20 is a schematic view illustrating the overall configuration of a sheet processing device according to still yet further another embodiment of the present disclosure. The sheet processing device 100 according to the present embodiment includes an ejection tray 104 and an ejection tray 131. The ejection tray 104 serving as a first stacking unit stacks lamination sheets S conveyed through a sheet processing path 99 and a heat-pressing conveyance path 128. The ejection tray 131 serving as a second stacking unit stacks sheets conveyed through the sheet ejection path 124 without passing through the sheet processing path 99 and the heat-pressing conveyance path 128. Discharging a sheet subjected to laminate processing and a sheet subjected to normal printing (copying, printing, or the like) without being laminated to separate ejection trays can prevent output materials from being mixed, thus enhancing visibility and ease of taking out the sheet and the sheet of paper. Other configurations are equivalent to those of the sheet processing device 100 according to the above-described embodiment.

In the configuration of the sheet processing device 100 illustrated in FIG. 14, when the lamination sheet S is ejected from the conveyance path formed above the sheet processing device 100, the distance to the ejection tray 104 is large, so that the lamination sheet S stacked on the ejection tray 104 might be disturbed. However, the configuration of the sheet processing device 100 illustrated in FIG. 20 can ensure a stable stacking performance even when the sheet is ejected from any of the sheet processing path 99 and the sheet ejection path 124.

Figure 21A:
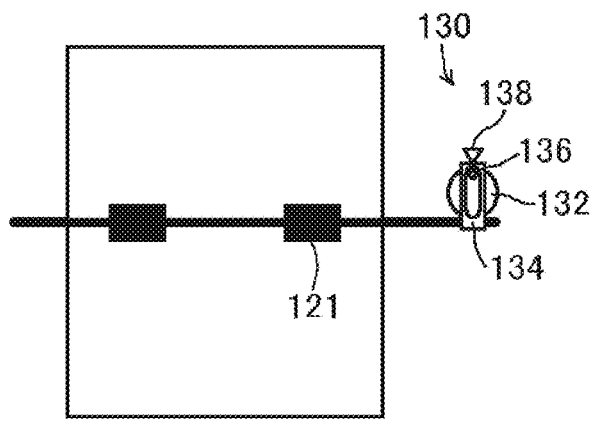
FIGS. 21A, 21B, and 21C are schematic plan views of a sheet sorting mechanism that sorts sheets when the sheets are ejected to an ejection tray.
Figure 21B:
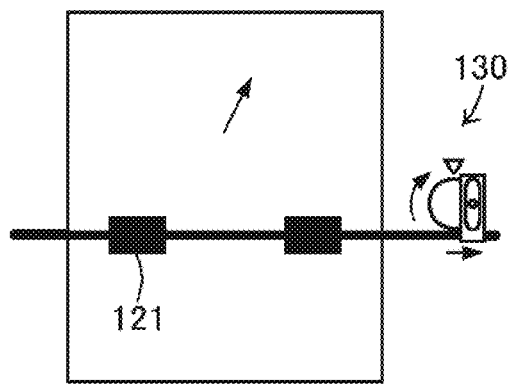
Figure 21C:
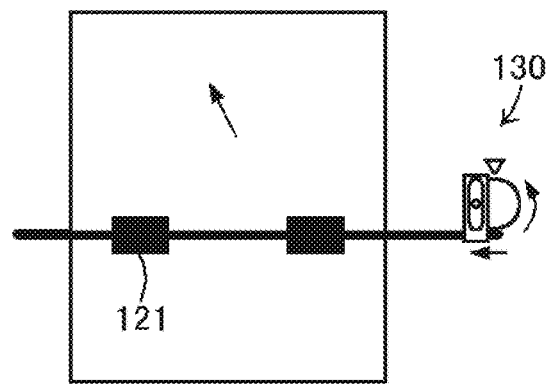

FIGS. 21A, 21B, and 21C are schematic plan views illustrating a sheet sorting mechanism that sorts sheets when the sheets are ejected to an ejection tray. The sheet processing device 100 includes a sheet sorting mechanism 130 capable of changing the stack position of a lamination sheet S on the ejection tray 104 in a direction orthogonal to the sheet conveyance direction. A lamination sheet S, a sheet of paper, or an inner sheet P to be ejected to the ejection tray 104 are sorted on the ejection tray 104 by the sheet sorting mechanism 130. In this way, sheets subjected to laminate processing and sheets subjected to normal printing (copying, printing, or the like) without being laminated are shifted, sorted, and ejected. Thus, output materials are not mixed together, and the visibility and the ease of taking out sheets and sheets are enhanced.

For example, one or both of the ejection roller 121 and the ejection roller 123 are changed to a shift roller(s) that is movable in a direction (horizontal direction in FIGS. 21A, 21B, and 21C) perpendicular to the sheet conveyance direction.

For example, the sheet sorting mechanism 130 as illustrated in FIGS. 21A, 21B, and 21C is installed on, for example, the ejection roller 121. The sheet sorting mechanism 130 includes a shift cam 132, a shift link 134, a shift cam stud 136, and a shift home-position (HP) sensor 138. As the shift cam 132 rotates, the shift link 134 follows the movement of the shift cam stud 136. Accordingly, the ejection roller 121 moves in the direction perpendicular to the sheet conveyance direction, to shift a lamination sheet S. Thus, sheets can be sorted on the ejection tray 104. Seen from the home position of the sheet sorting mechanism 130 illustrated in FIG. 21A, in FIG. 21B, the ejection roller 121 moves to the right and the lamination sheet S is ejected to the right side, and in FIG. 21C, the ejection roller 121 moves to the left and the lamination sheet S is ejected to the left side.

Figure 22:
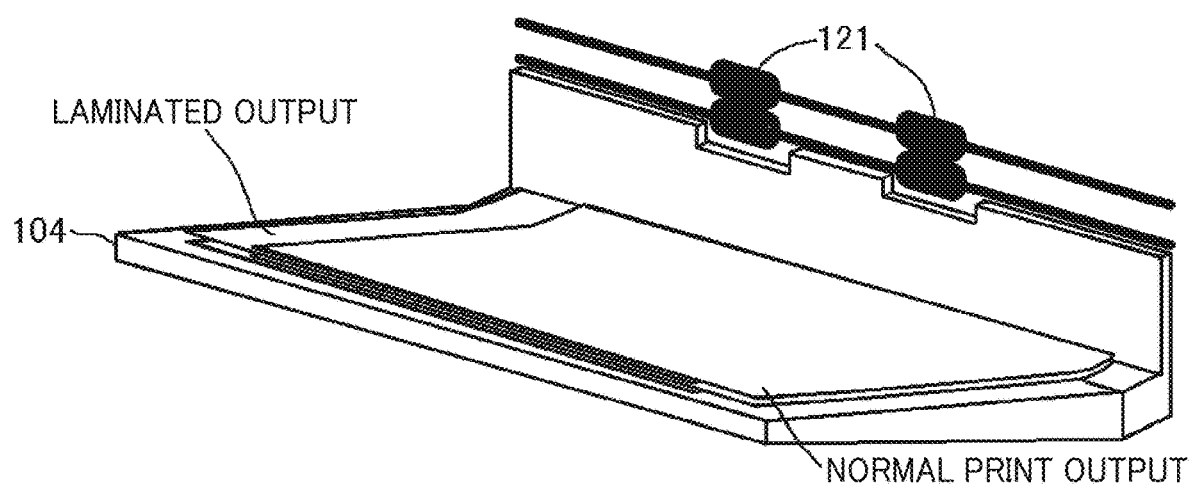
FIG. 22 is a schematic perspective view of lamination sheets sorted by the sheet sorting mechanism illustrated in FIGS. 21A, 21B, and 21C.

FIG. 22 is a schematic perspective view of lamination sheets sorted by the sheet sorting mechanism of FIGS. 21A, 21B, and 21C. Lamination sheets S ejected while being shifted by the sheet sorting mechanism 130 illustrated in FIGS. 21A, 21B, and 21C are shifted and stacked on the ejection tray 104 as illustrated in FIG. 22. Accordingly, it is easy to distinguish between the laminated sheets subjected to the heat pressing processing and the sheets output by the normal printing.

As the sheet sorting mechanism, the ejection tray 104 may be configured to be movable in a direction perpendicular to the sheet conveying direction, or a mechanism that shifts the lamination sheet S may be provided at the sheet ejection port.

A laminate processing apparatus according to an embodiment of the present disclosure includes the above-mentioned sheet processing device 100 and heat-pressing rollers 120 as a heat-pressing member that heats and presses a lamination sheet S at a position downstream from the sheet processing path 99.

The image forming apparatus 300 according to an embodiment of the present disclosure includes the above-described sheet processing device 100 and an image forming device 305 disposed upstream from the sheet processing device 100 in the sheet conveyance direction. The sheet processing device 100 may be built in the image forming apparatus.

An image forming system according to an embodiment of the present disclosure includes the sheet processing device 100 inside the image forming apparatus 300 and a post-processing apparatus disposed downstream from the sheet processing device 100 in the sheet conveyance direction. The post-processing apparatus can staple, for example, printed sheets.

Figure 23:
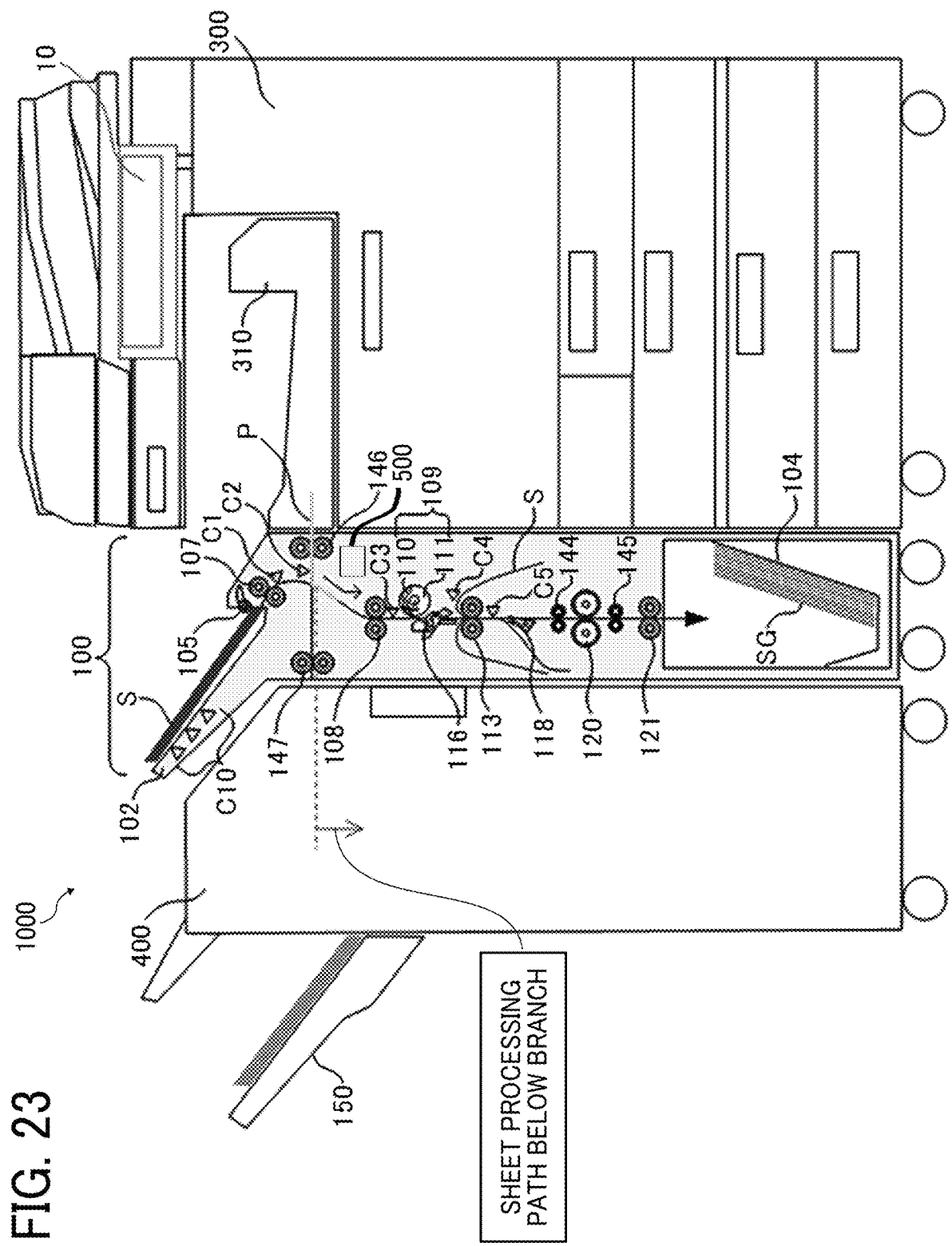
FIG. 23 is a schematic diagram illustrating a configuration of an image forming system including an image forming apparatus, a relay device, a sheet processing device, and a post-processing apparatus, according to an embodiment of the present disclosure.

FIG. 23 is a schematic diagram illustrating a configuration of an image forming system including an image forming apparatus 300, a relay device 310, a sheet processing device 100, and a post-processing apparatus 400. In the following description, parts having similar functions to those of the above-described apparatus or device have the same reference numerals. The image forming apparatus 300 includes an operation panel 10. An image forming system 1000 according to the present embodiment can feed an inner sheet P from the image forming apparatus 300 via the relay device 310 and insert any image in an in-line manner according to a method utilizing a copier or a printer. Accordingly, a series of operations from the feeding of a lamination sheet S to the separation of the lamination sheet S, the insertion of an inner sheet P, and the laminate processing under heat and pressure can be performed without requiring manpower, and convenience is enhanced as compared with a conventional art.

In the case of a print job in which laminate processing is performed, the sheet processing device 100 feeds a lamination sheet S from a sheet tray 102 on which lamination sheets S are stacked, by a pickup roller 105 and a conveyance roller pair 107. The separated sheet S is held by an exit roller pair 113, receives the inner sheet P fed from the image forming apparatus 300 by an entrance roller pair 146, merges with the lamination sheet S by the entrance roller pair 108, and is heated by the heat-pressing roller 120 to be laminated. The laminated sheet SG with the inner sheet is stacked on the ejection tray 104 by the ejection roller 121.

Accordingly, in the laminate processing, it takes a time to separate the lamination sheet S and apply necessary heat to the lamination sheet S in which the inner sheet P is inserted. As described above, conventionally, another job cannot be executed during the job of the laminate processing, which cause a reduction in the productivity of the entire system. According to at least one embodiment of the present disclosure, as described below, the productivity of the entire system can be enhanced by executing another job using a sheet ejection path (through conveyance path) that does not pass through a processing path while executing a certain part of a print job that requires some time per copy in sheet processing.

Figure 24:
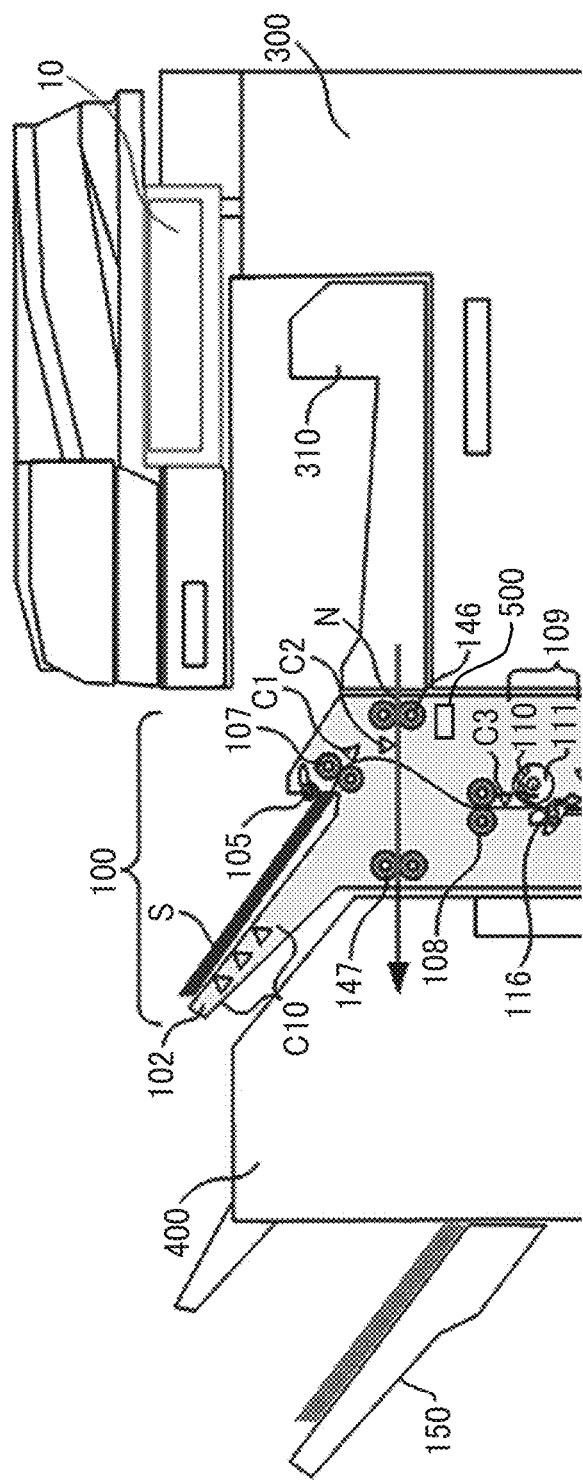
FIG. 24 is a schematic diagram illustrating a configuration of an image forming system according to an embodiment of the present disclosure.

FIG. 24 is a diagram illustrating a schematic configuration of an image forming system 1000 according to an embodiment of the present disclosure. In the case of a print job in which laminate processing is not performed, a sheet-shaped medium (hereinafter referred to as a sheet material N) fed from the image forming apparatus 300 is received by an entrance roller pair 146 of the sheet processing device 100, and is conveyed to a post-processing apparatus 400 located downstream from the sheet processing device 100 by an ejection roller pair 147 located downstream from the entrance roller pair 146 in the conveyance direction. The post-processing apparatus 400 can perform post-processing such as staple processing on the sheet material N that has not been subjected to laminate processing.

As illustrated in FIGS. 23 and 24, the sheet processing device 100 includes a sheet processing path and a sheet ejection path. The sheet processing path is a first conveyance path through which a sheet is conveyed to perform post-processing (laminate processing). The sheet ejection path is a second conveyance path through which the sheet is ejected downstream without performing laminate processing. In FIG. 23, the sheet processing path serving as the first conveyance path is disposed below a branching portion of the first conveyance path and the second conveyance path. The sheet ejection path serving as the second conveyance path is disposed on the left from the branching portion in FIG. 23. In addition to these paths, there is provided a configuration of system control that enables execution of a print job in which laminate processing is not performed during a print job in which laminate processing is performed. Thus, the time of laminate processing can be effectively utilized, thus enhancing the productivity of the entire system. The sheet tray 102 is provided with a plurality of sensors C10 that detect the size of the lamination sheet S.

FIGS. 25 to 29 illustrate an example of a case where a job 1 with laminate processing and a job 2 without laminate processing are executed in the image forming system 1000 having such system control. In this example, the job 1 is for performing the laminate processing of two copies of the lamination sheet S and the inner sheet P, and the job 2 is for performing a job (for example, printing) without the laminate processing of 100 copies of the sheet material N.

Figure 25:
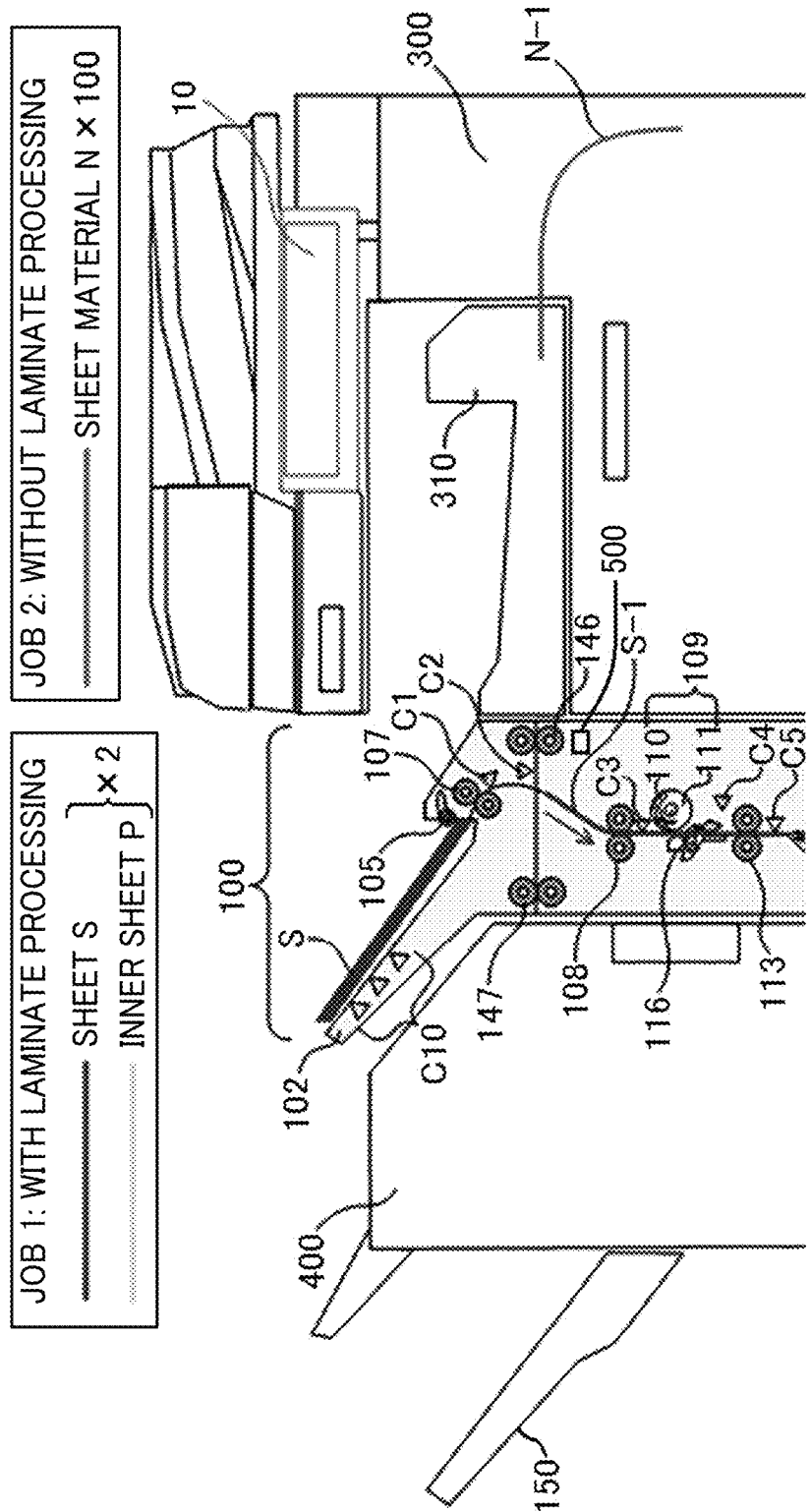
FIG. 25 is a schematic diagram illustrating a part of the image forming system of FIG. 24.

First, in the sheet processing device 100 illustrated in FIG. 25, a lamination sheet S-1 of the first copy of the job 1 is fed from the sheet tray 102. In the image forming apparatus 300, the job 2 is executed before the separation of the lamination sheet S-1 is completed, and a first sheet material N-1 is conveyed. In other words, control is performed so that the job 2 can be interrupted in the middle of one copy of the job 1.

Figure 26:
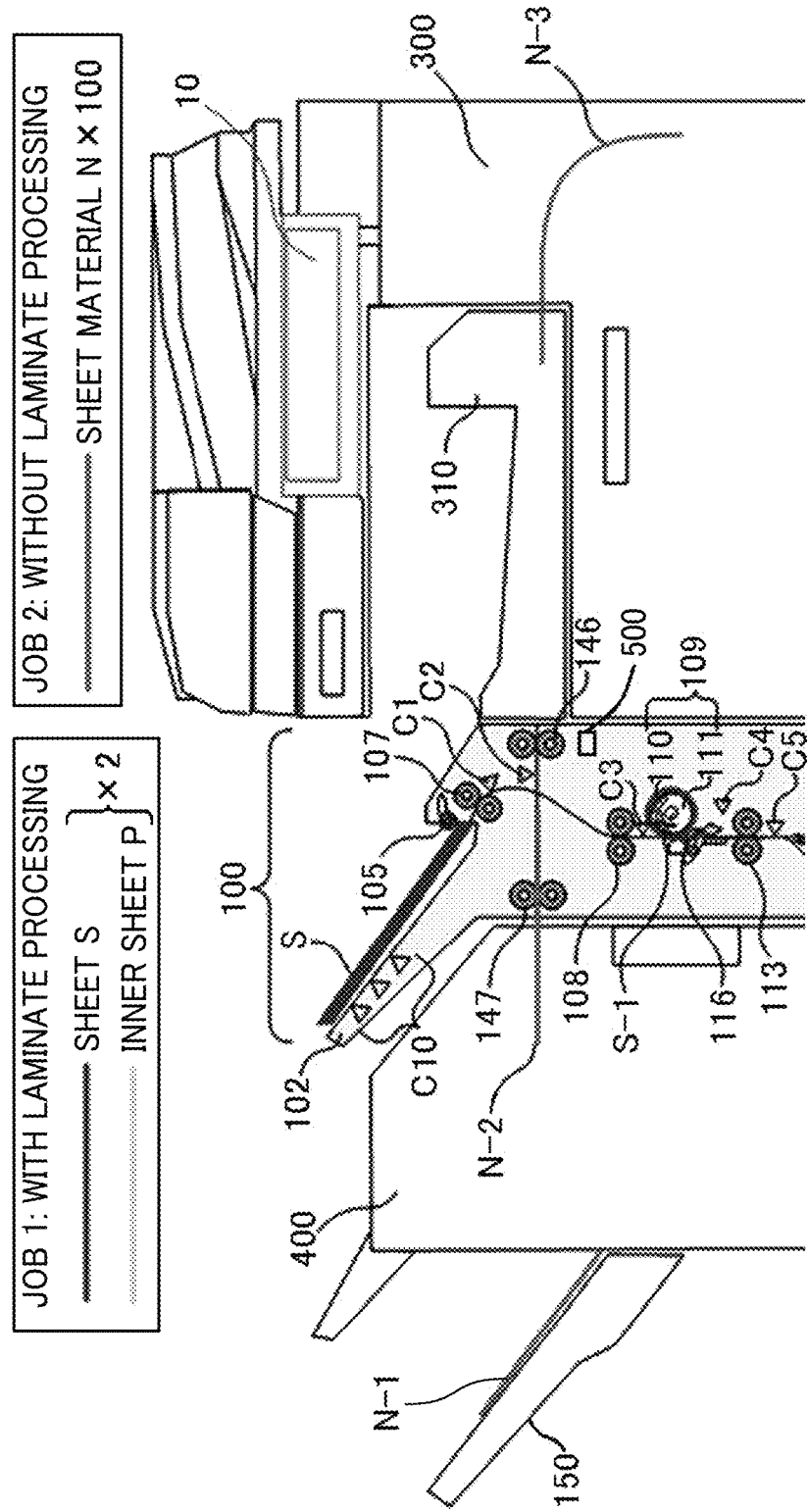
FIG. 26 is a schematic diagram illustrating a part of the image forming system of FIG. 24.

Next, in FIG. 26, while the sheet processing device 100 performs the separating operation of the lamination sheet S-1, a second sheet material N-2 and a third sheet material N-3 and subsequent sheets of the job 2 are sequentially conveyed in accordance with the productivity of the image forming apparatus 300. In FIG. 26, the sheet material N-1 is stacked on the ejection tray 150 of the post-processing apparatus 400, the sheet material N-2 is being conveyed through the sheet ejection path, and the sheet material N-3 is being conveyed through the image forming apparatus 300.

Figure 27:
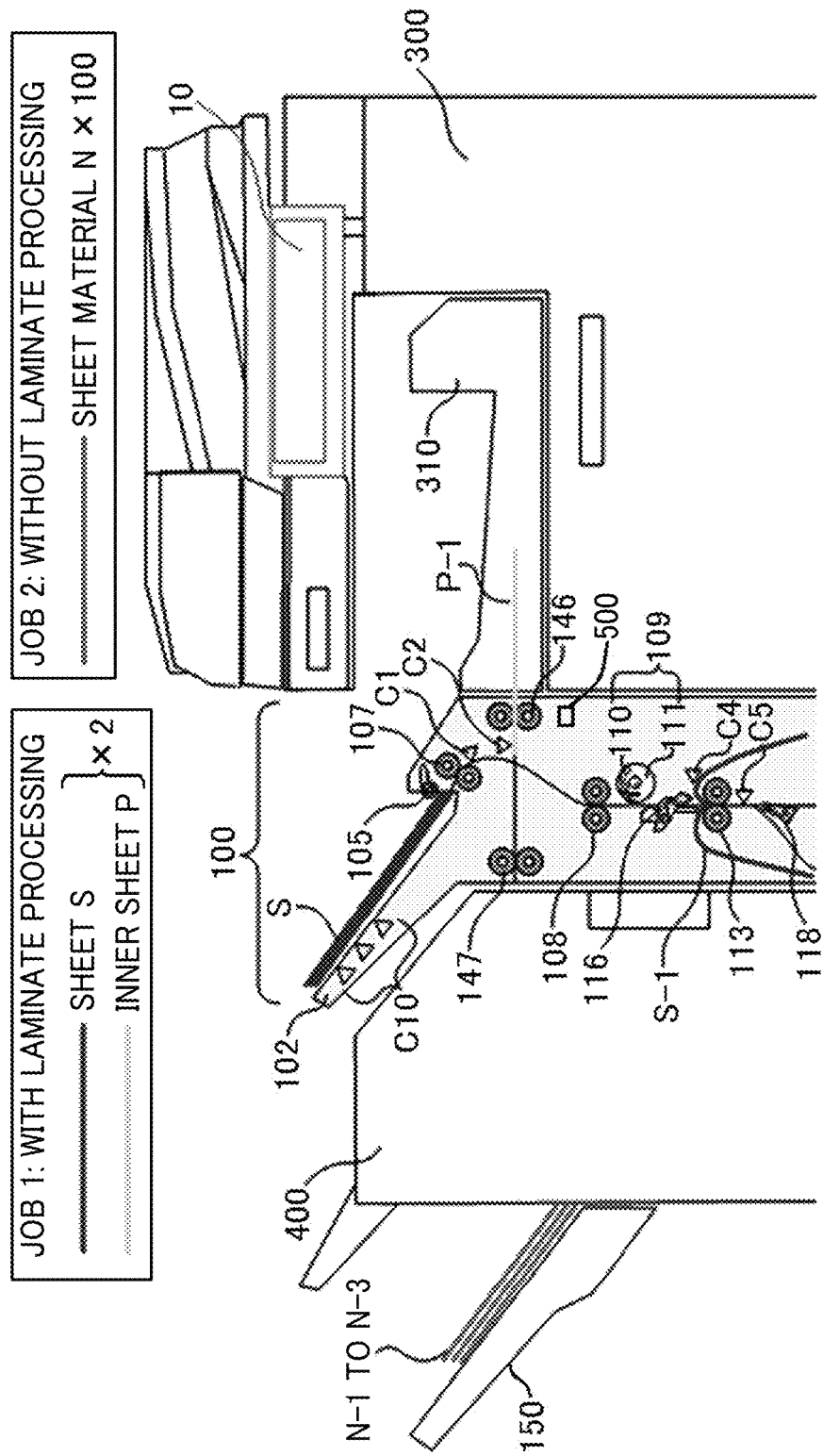
FIG. 27 is a schematic diagram illustrating a part of the image forming system of FIG. 24.
Figure 28:
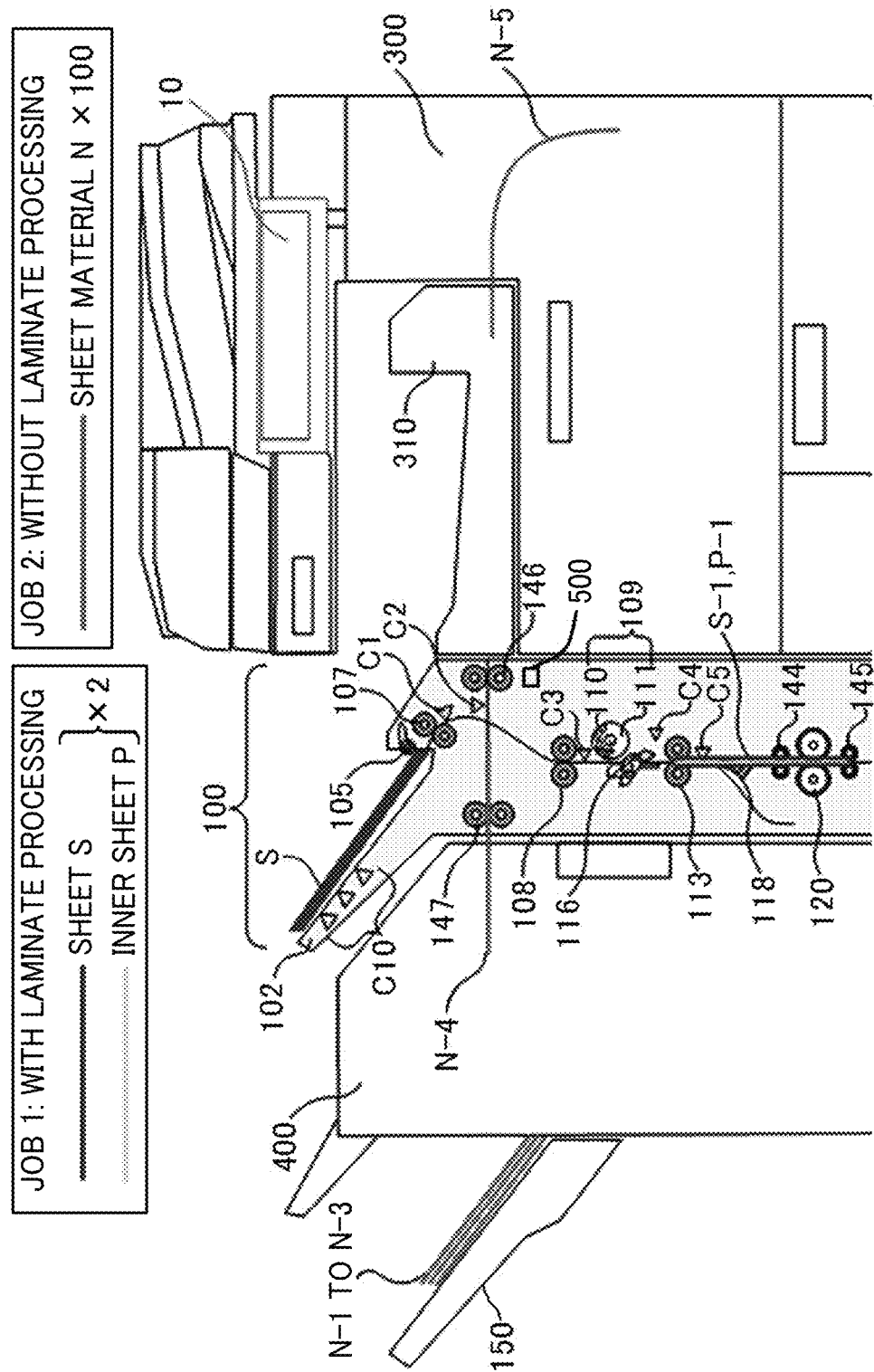
FIG. 28 is a schematic diagram illustrating a part of the image forming system of FIG. 24.

Next, in FIG. 27, in a state in which the sheet processing device 100 completes the separation of the lamination sheet S-1, an inner sheet P-1 of the first copy of the job 1 is conveyed from the image forming apparatus 300. That is, the continuation of the first copy of the job 1 is controlled to be resumed in the middle of the job 2. In FIG. 27, the sheet materials N-1, N-2, and N-3 are stacked on the ejection tray 150, and the inner sheet P-1 is being conveyed from the image forming apparatus 300 into the sheet processing device 100. Next, in FIG. 28, while the sheet processing device 100 performs the steps of sandwiching the inner sheet P-1 in the lamination sheet S-1, positioning the lamination sheet S-1 and the inner sheet P-1, and laminating the inner sheet P-1 and the lamination sheet S-1 by heating of the heat-pressing roller 120, the job 2 is continued again, and the sheet material N is conveyed from the image forming apparatus 300. In other words, control is performed so that the job 2 can be interrupted during execution of the first copy of the job 1. In FIG. 28, the sheet materials N-1, N-2, and N-3 are stacked on the ejection tray 150, a sheet material N-4 is being conveyed through the sheet ejection path, and a sheet material N-5 is being conveyed through the image forming apparatus 300.

Figure 29:
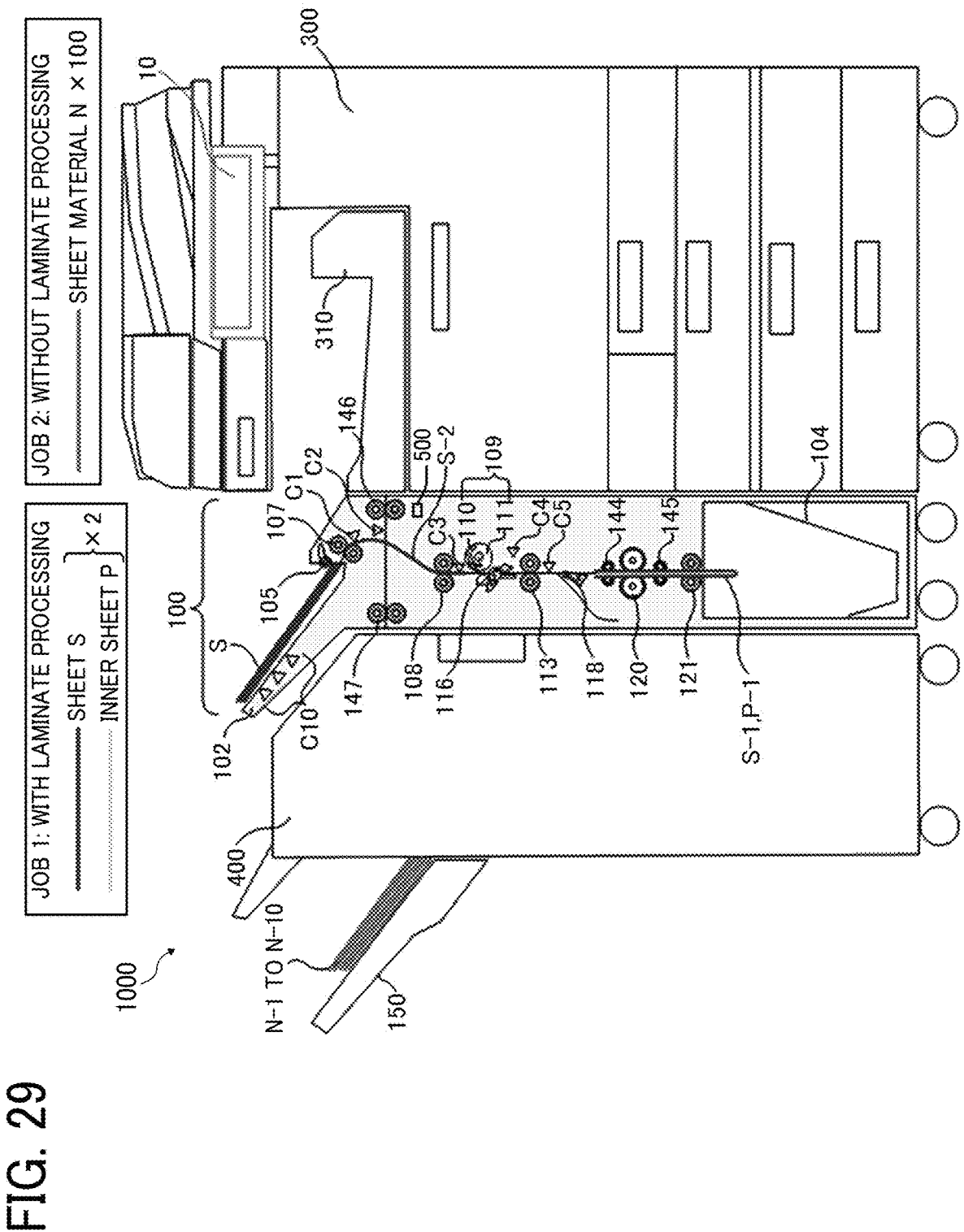
FIG. 29 is a schematic diagram illustrating the image forming system of FIG. 24.

Next, in FIG. 29, in the sheet processing device 100, when the trailing ends of the laminated sheet S-1 and the inner sheet P-1 pass through the conveyance sensor C5 and are conveyed by a designated amount, a lamination sheet S-2 of the second copy of the job 1 is fed. In other words, the continuation of the first copy of the job 1 is controlled to be resumed in the middle of the job 2. In FIG. 29, ten sheets of sheet materials N-1, N-2, . . . and, N-10 are stacked on the ejection tray 150.

Thereafter, the processes illustrated in FIGS. 26 to 29 are repeated until the job 1 with the laminate processing is completed. With the above-described control, the productivity of the system as a whole can be enhanced by executing another job without laminate processing during a job with laminate processing.

As described above, according to the image forming system 1000 of the present embodiment, when a plurality of print jobs including both a print job of one copy or N copies (N≥2) to be post-processed by the sheet processing device 100 and a print job not to be post-processed by the sheet processing device 100 are instructed, a print job not to be post-processed is executed while an arbitrary M-th copy (1≤M<N) of the print job to be post-processed is executed, and a sheet is conveyed through the second conveyance path.

Further, while the arbitrary M-th copy (1≤M<N) of the print job subjected to post-processing is being executed, a print job not subjected to post-processing is executed. The (M+1)-th copy of the print job subjected to post-processing can be started before completion of the print job not subjected to post-processing. Accordingly, another print job without post-processing can be executed during a print job with post-processing, and the print job with post-processing can be restarted in the middle of the other print job.

As illustrated in FIG. 9, the image forming apparatus 300 includes an image forming device that forms an image on a sheet and the sheet processing device 100 that performs post-processing on the sheet on which the image has been formed. The sheet processing device 100 includes a first conveyance path through which a sheet is conveyed to perform post-processing and a second conveyance path through which a sheet is conveyed downstream without performing post-processing. When a plurality of print jobs including both a print job of one copy or N copies (N≥2) to be post-processed by the sheet processing device 100 and a print job not to be post-processed by the sheet processing device 100 are instructed, a print job not to be post-processed is executed while an arbitrary M-th copy (1≤M<N) of the print job to be post-processed is executed, and a sheet is conveyed through the second conveyance path.

As illustrated in FIG. 1, the sheet processing device 100 that performs post-processing on a sheet includes a first conveyance path through which a sheet is conveyed to perform post-processing and a second conveyance path through which a sheet is conveyed downstream without performing post-processing. When a plurality of print jobs including both a print job of one copy or N copies (N≥2) to be post-processed and a print job not to be post-processed are instructed, a print job not to be post-processed is executed while an arbitrary M-th copy (1≤M<N) of the print job to be post-processed is executed, and a sheet is conveyed through the second conveyance path.

Figure 30:
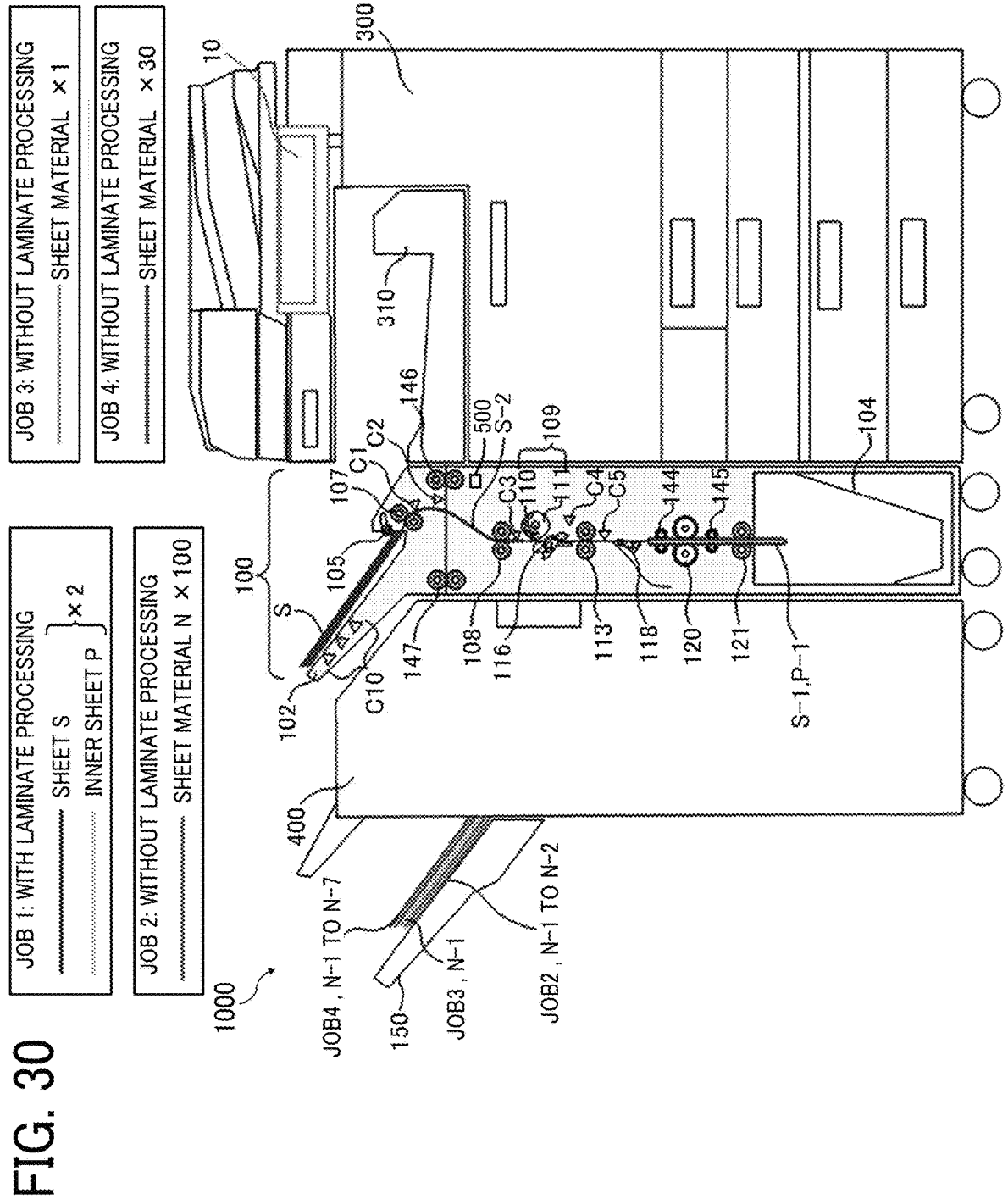
FIG. 30 is a schematic diagram illustrating the image forming system of FIG. 24 that executes another job.

FIG. 30 illustrates an example in which another job is executed in the image forming system 1000. In this example, in a case where the number of sheets of the job 2 without laminate processing is smaller than the number of sheets without laminate processing that can be processed during execution of the job 1 with laminate processing, control is performed so that a plurality of jobs subsequent to the job 3 can be interrupted in the middle of the copy of the job 1. The job 1 performs the laminate processing of two copies of lamination sheets S and inner sheets P, the job 2 is a job (e.g., printing) without laminating of two copies of sheet materials N, the job 3 is a job (e.g., printing) without laminating of one copy of sheet material N, and the job 4 is a job (e.g., printing) without laminating of 30 copies of sheet materials N.

In FIG. 30, as a result of the job 2, 3, and 4 being interrupted during the execution of the first copy of the job 1, seven sheets of the sheet materials N-1 and N-2 of the job 2, the sheet material N-1 of the job 3, and the sheet materials N-1 to N-7 of the job 4 are stacked on the ejection tray 150. Then, similarly to FIG. 29, in the sheet processing device 100, when the trailing ends of the lamination sheet S-1 and the inner sheet P-1 subjected to the laminate processing in the job 1 pass through the conveyance sensor C5 and are conveyed by a designated amount, the lamination sheet S-2 of the second copy of the job 1 is fed.

Figure 31:
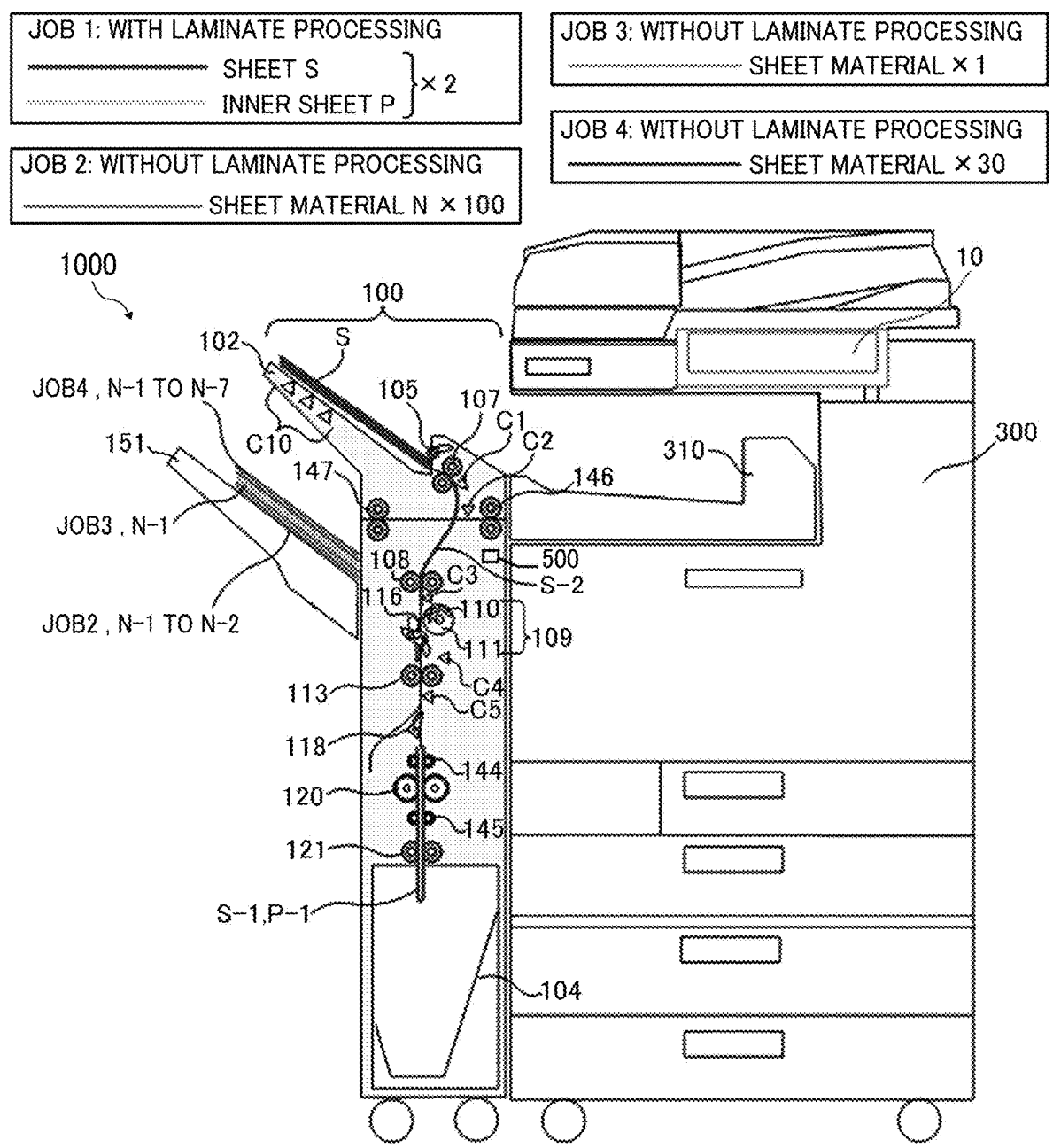
FIG. 31 is a schematic diagram illustrating an image forming system according to another embodiment of the present disclosure, which executes the same job as in FIG. 30.

FIG. 31 illustrates an example of executing the same job as in FIG. 30 in an image forming system according to another embodiment of the present disclosure. An image forming system 1000 according to the present embodiment includes an image forming apparatus 300, a relay device 310, and a sheet processing device 100. The sheet processing device 100 includes an ejection tray 151 in addition to the above-described configuration. As illustrated in FIG. 31, the sheet processing device 100 receives a sheet material N not subjected to the laminate processing by an entrance roller pair 146, and stacks the sheet material N on the ejection tray 151 of the sheet processing device 100 itself by an ejection roller pair 147 located downstream of the entrance roller pair 146 in the sheet conveyance direction.

Figure 32:
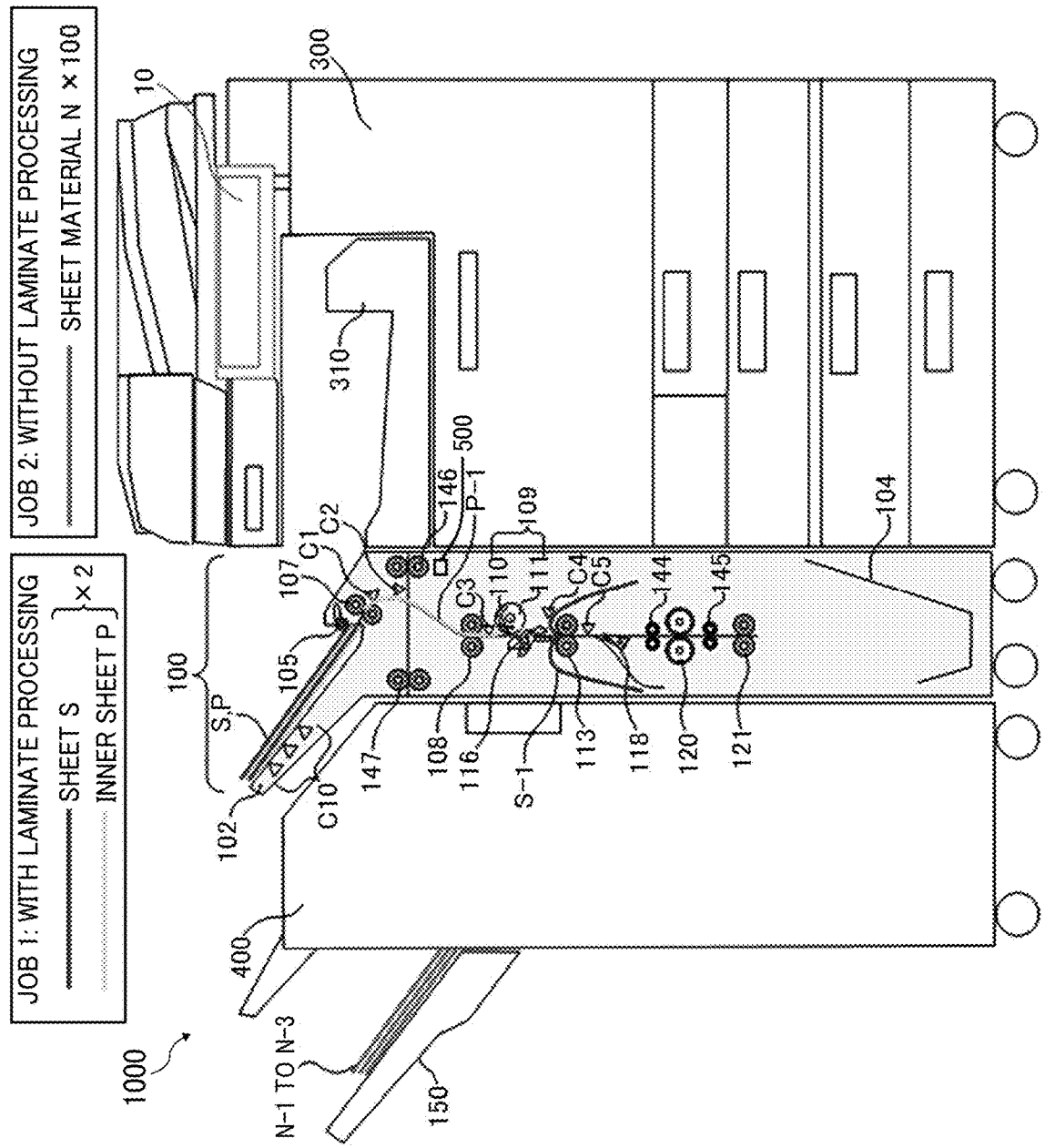
FIG. 32 is a variation of the image forming system illustrated in FIG. 27.

FIG. 32 is a variation of the image forming system according to the above-described embodiment illustrated in FIG. 27. In this variation, lamination sheets S and inner sheets P are alternately stacked on a sheet tray 102 for stacking the lamination sheets S. Similarly to FIG. 27, in a state in which the sheet processing device 100 has completed the separation of a lamination sheet S-1 of the first copy of the job 1, an inner sheet P-1 stacked under the lamination sheet S-1 is supplied from the sheet tray 102. After that, laminate processing is performed by sandwiching the inner sheet P-1 and heating the lamination sheet S-1 and the inner sheet P-1, and the job 1 and the job 2 are executed while the job 2 is inserted into the job 1. Using the same sheet tray as the sheet tray for the inner sheet P and the lamination sheet S can reduce the printing time and enhance the productivity. In addition, off-line use is available.

Figure 33:
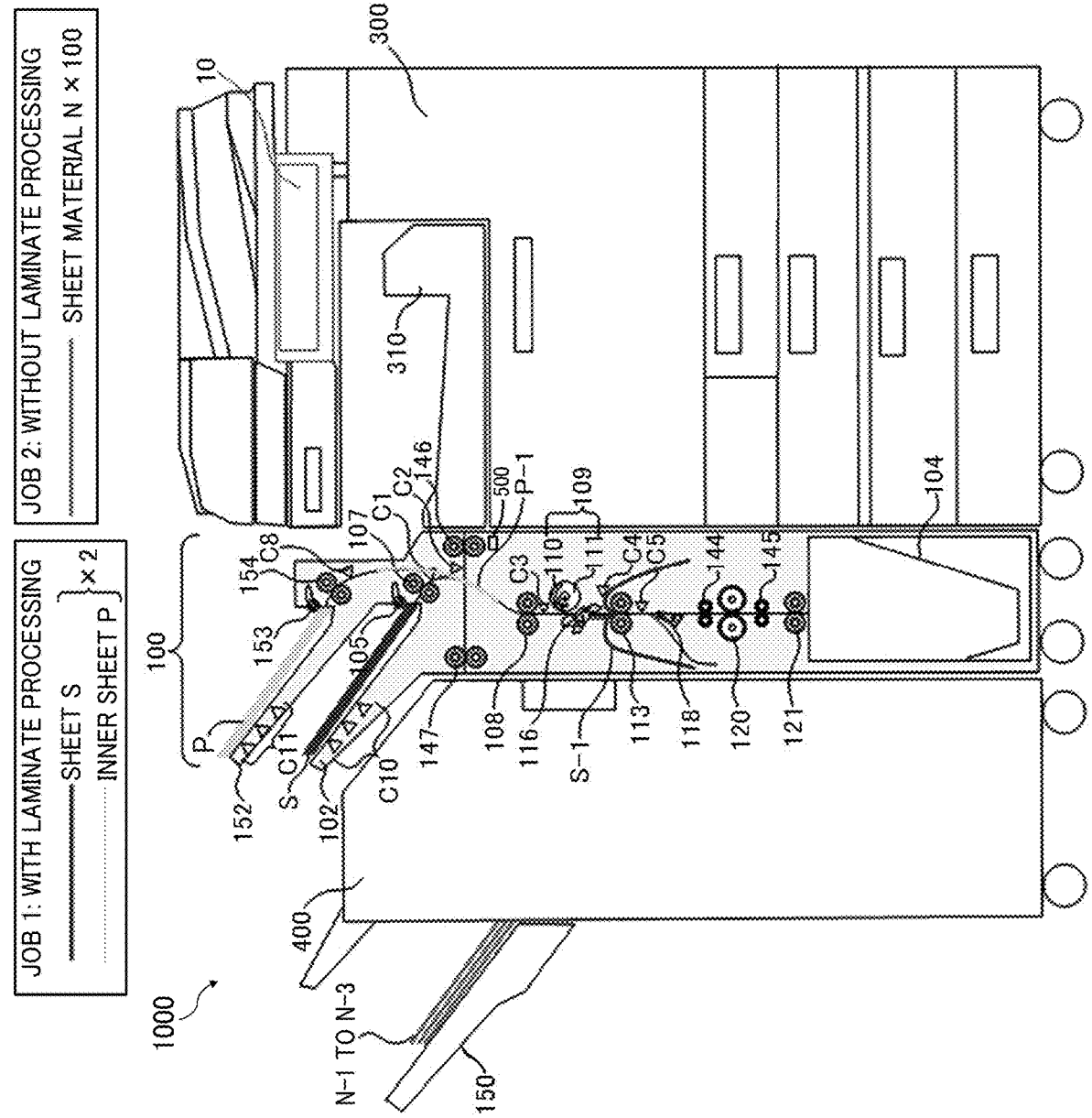
FIG. 33 is a variation of the image forming system illustrated in FIG. 32.

FIG. 33 is a variation of the image forming system illustrated in FIG. 32. As illustrated in FIG. 33, an image forming system 1000 according to the variation includes an image forming apparatus 300, a relay device 310, a sheet processing device 100, and a post-processing apparatus 400. The sheet processing device 100 according to the present variation includes a second sheet tray 152 serving as a second stacking unit for stacking inner sheets P above a sheet tray 102 for stacking lamination sheets S. Providing the sheet feeding tray dedicated to the inner sheet, the inner sheet P can be easily set in the sheet processing device 100. A plurality of sensors C11 that detect the size of the inner sheet P are disposed on the second sheet tray 152. Further, the sheet processing device 100 includes a pickup roller 153 that feeds an inner sheet P from the second sheet tray 152, a conveyance roller pair 154, and a conveyance sensor C8 that detects a conveyance position of the inner sheet P downstream from the conveyance roller pair 107 in the conveyance direction.

In the same manner as in FIG. 27, in a state in which the sheet processing device 100 has completed the separation of the lamination sheet S-1 of the first copy of the job 1, the inner sheet P-1 to be sandwiched in the sheet S-1 is supplied from the second sheet tray 152. Thus, the printing time can be reduced and the productivity of the entire system can be enhanced. After that, laminate processing is performed by sandwiching the inner sheet P-1 and heating the lamination sheet S-1 and the inner sheet P-1, and the job 1 and the job 2 are executed while the job 2 is inserted into the job 1.

Figure 34:
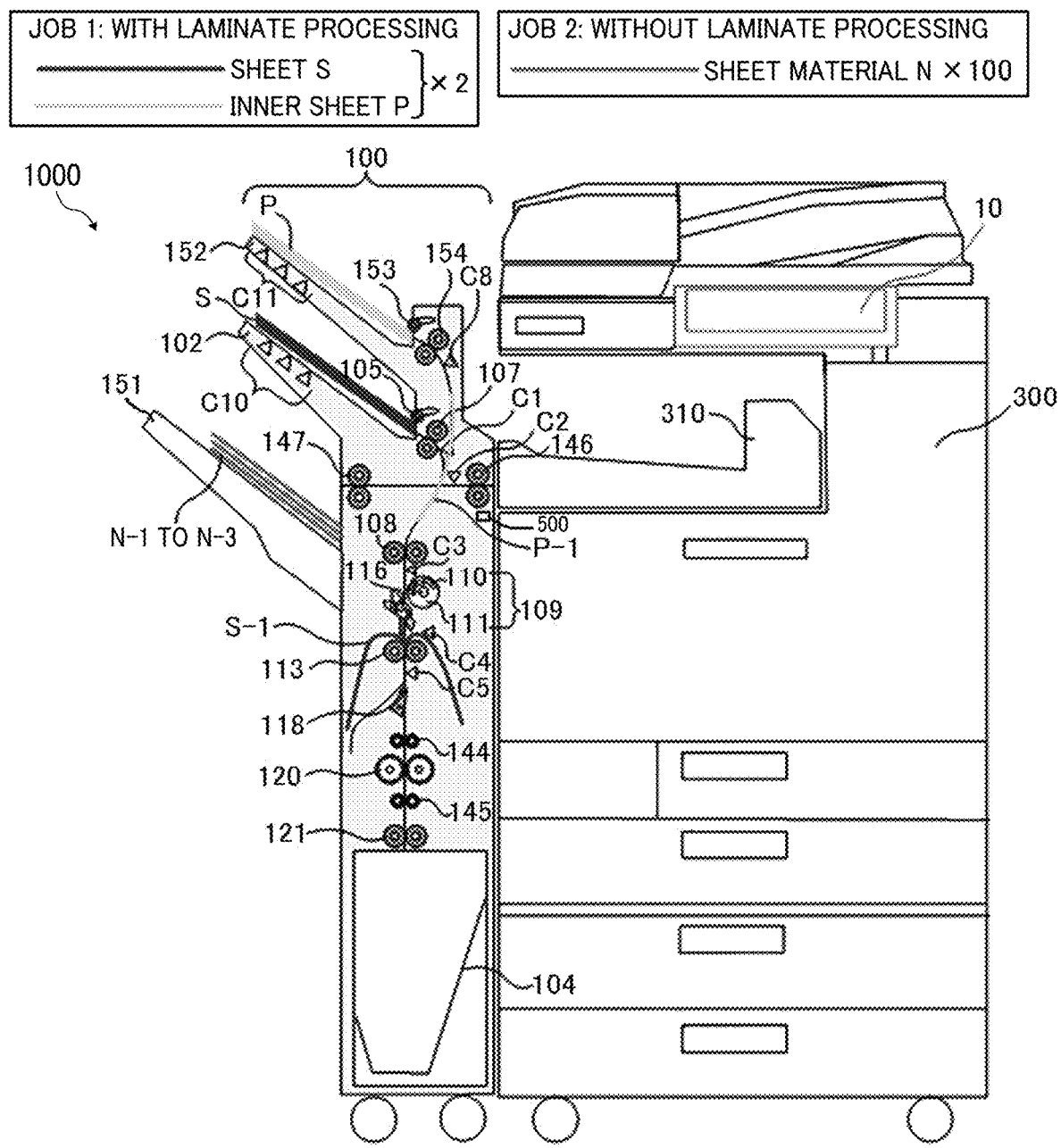
FIG. 34 is a variation of the image forming system illustrated in FIG. 33.

FIG. 34 is a variation of the image forming system illustrated in FIG. 33. An image forming system 1000 according to the present variation includes an image forming apparatus 300, a relay device 310, and a sheet processing device 100. The sheet processing device 100 includes an ejection tray 151 in addition to the above-described configuration illustrated in FIG. 33. As illustrated in FIG. 34, the sheet processing device 100 receives a sheet material N not subjected to the laminate processing by an entrance roller pair 146, and stacks the sheet material N on the ejection tray 151 of the sheet processing device 100 itself by an ejection roller pair 147 located downstream of the entrance roller pair 146 in the sheet conveyance direction. Here, the sheet materials N-1, N-2, and N-3 are stacked on the ejection tray 151.

In the case of the image forming system 1000 illustrated in any of FIGS. 32 to 34, the sheet processing device 100 can also be used as an off-line laminating machine.

Figure 35:
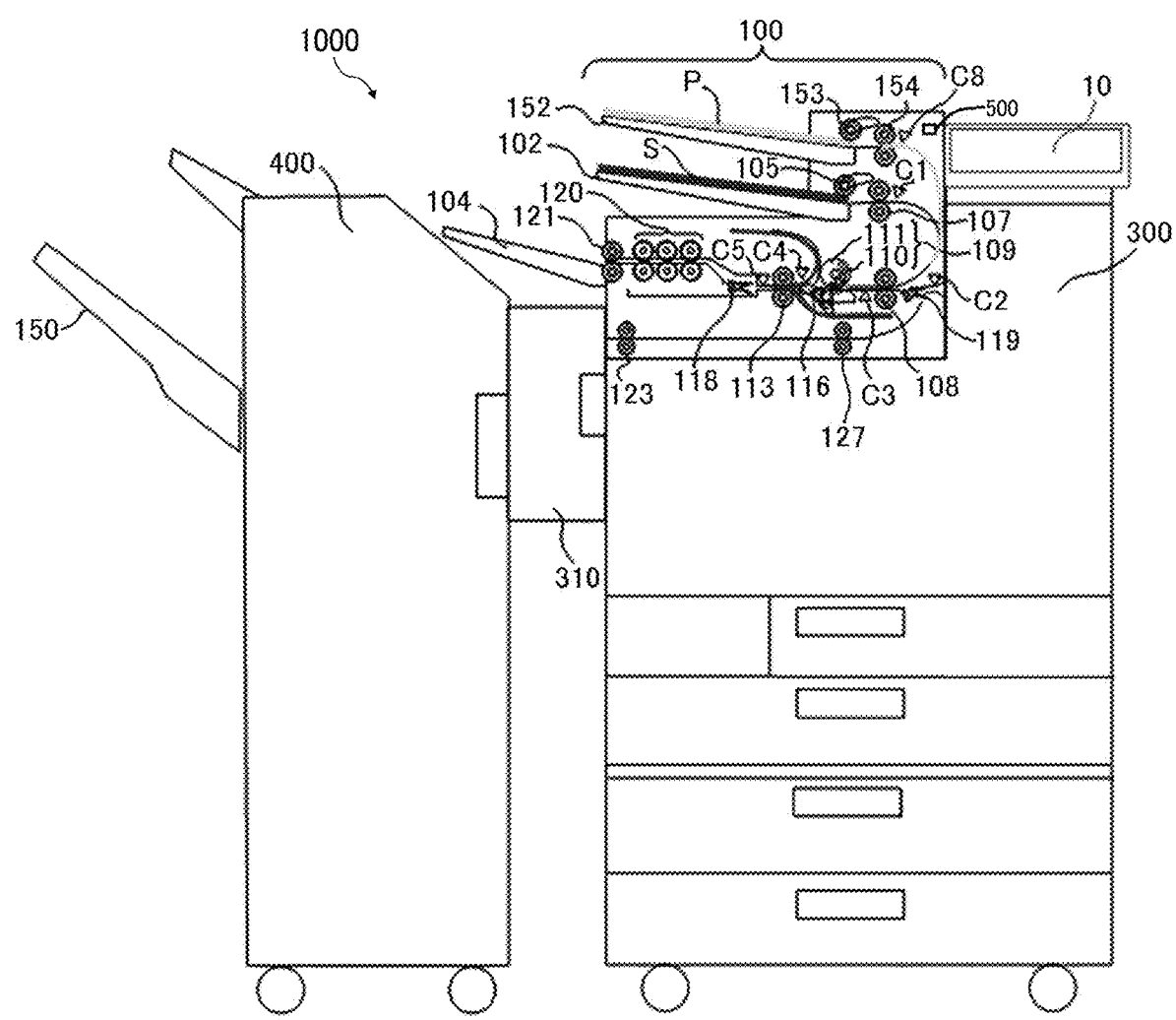
FIG. 35 is a schematic view of an image forming system according to another embodiment of the present disclosure.

FIG. 35 illustrates an image forming system according to another embodiment of the present disclosure. As illustrated in FIG. 35, an image forming system 1000 according to another embodiment of the present disclosure includes an image forming apparatus 300, a relay device 310, a sheet processing device 100, and a post-processing apparatus 400. The sheet processing device 100 is installed in a space inside the image forming apparatus 300. The sheet processing device 100 includes a sheet tray 102 for stacking lamination sheets S, a second sheet tray 152 disposed above the sheet tray 102 for stacking inner sheets P, and an ejection tray 104 serving as a stacking unit for stacking ejected lamination sheets S. Thus, the inner sheet P can be supplied to the separated sheet S by the sheet processing device 100.

Figure 36C:
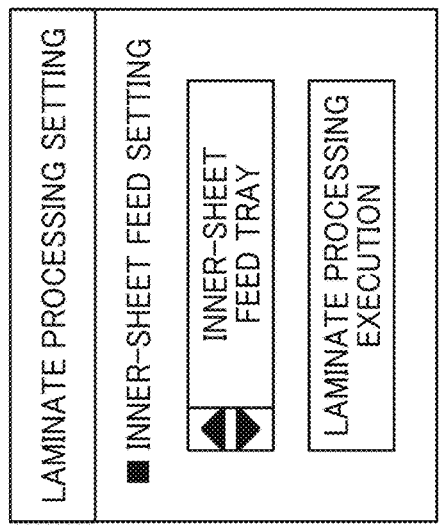
FIGS. 36A, 36B, and 36C are diagrams illustrating screens of an operation panel according to an embodiment of the present disclosure.
Figure 36B:
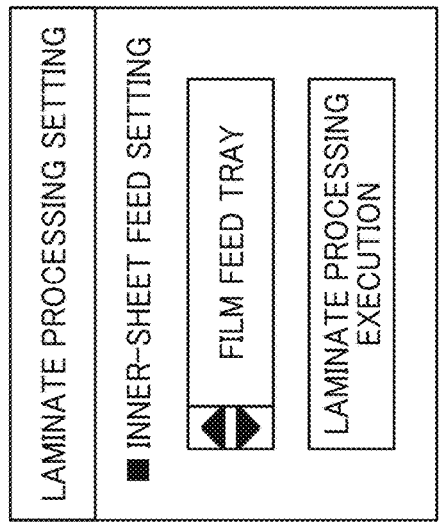
Figure 36A:
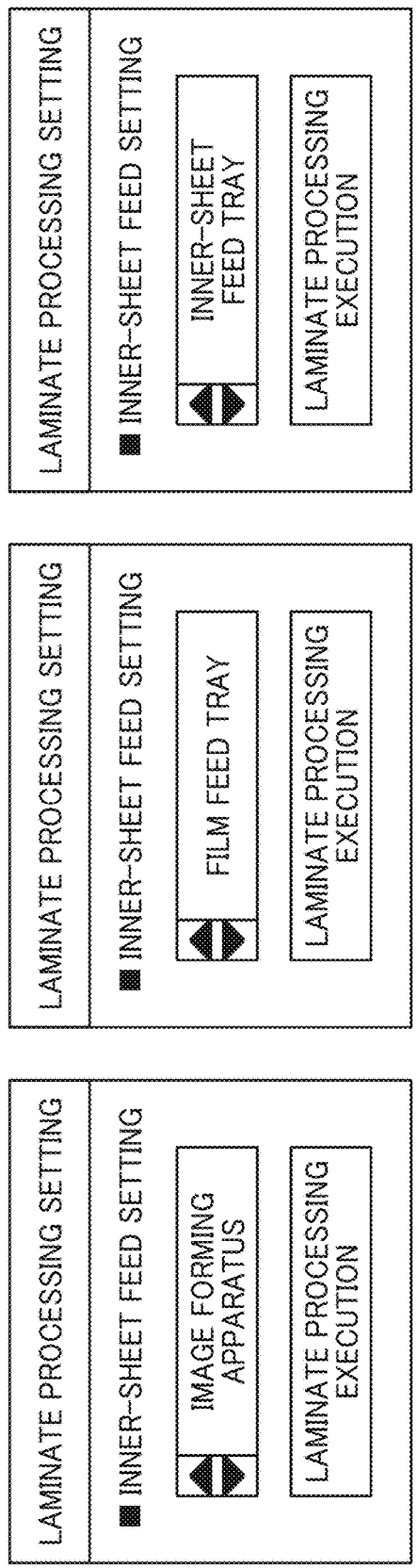

FIGS. 36A, 36B, and 36C are other diagrams illustrating the operation panel 10. As illustrated in FIGS. 32 to 35, when the sheet processing device 100 has an inner-sheet feeding function, the user can select whether an inner-sheet P is supplied to the image forming apparatus 300 (FIG. 36A), a film feeding tray (sheet tray 102) of the sheet processing device 100 (FIG. 36B), or an inner-sheet feeding tray (second sheet tray 152) of the sheet processing device 100 (FIG. 36C) from an "inner-sheet feed setting" screen of the operation panel 10.

Figure 37B:
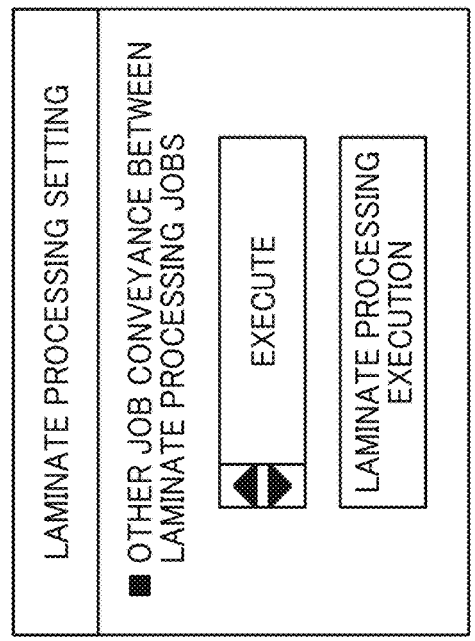
FIGS. 37A and 37B are diagrams of screens of the operation panel.
Figure 37A:
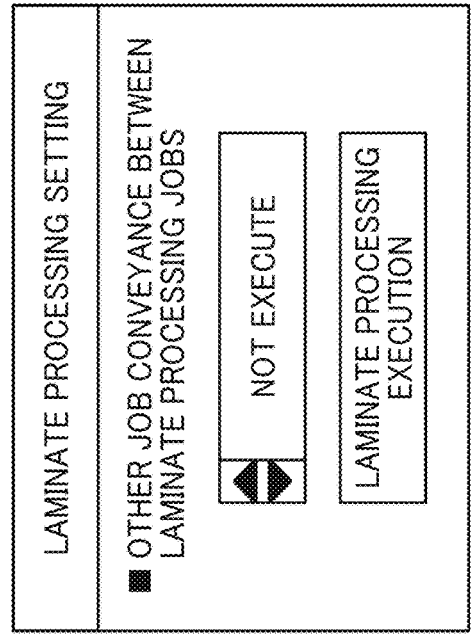

FIGS. 37A and 37B are other diagrams illustrating the operation panel 10. The user can select whether a job in which laminate processing is not performed between the above-described laminate processing jobs can be executed (FIG. 37A), or whether the job can be executed (FIG. 37B), from an "other job conveyance between laminate processing jobs" screen of the operation panel 10.

More specifically, the user can select whether a sheet material conveyed from the image forming apparatus 300 can be conveyed along the second conveyance path of the sheet processing device 100 during execution of the post-processing of the M-th copy ($1 \leq M \leq N$) in the print job of one copy or N copies ($N \geq 2$). In this way, the user can select whether to process another job during a print job that takes some time per one copy of post-processing.

Referring to FIG. 23, the sheet processing device 100 includes the ejection tray 104 serving as a sheet ejection unit that stacks post-processed sheets SG without passing through the second conveyance path. Thus, the post-processed sheets SG are stacked on the dedicated tray, so that the user can easily access the sheets.

Figure 38:
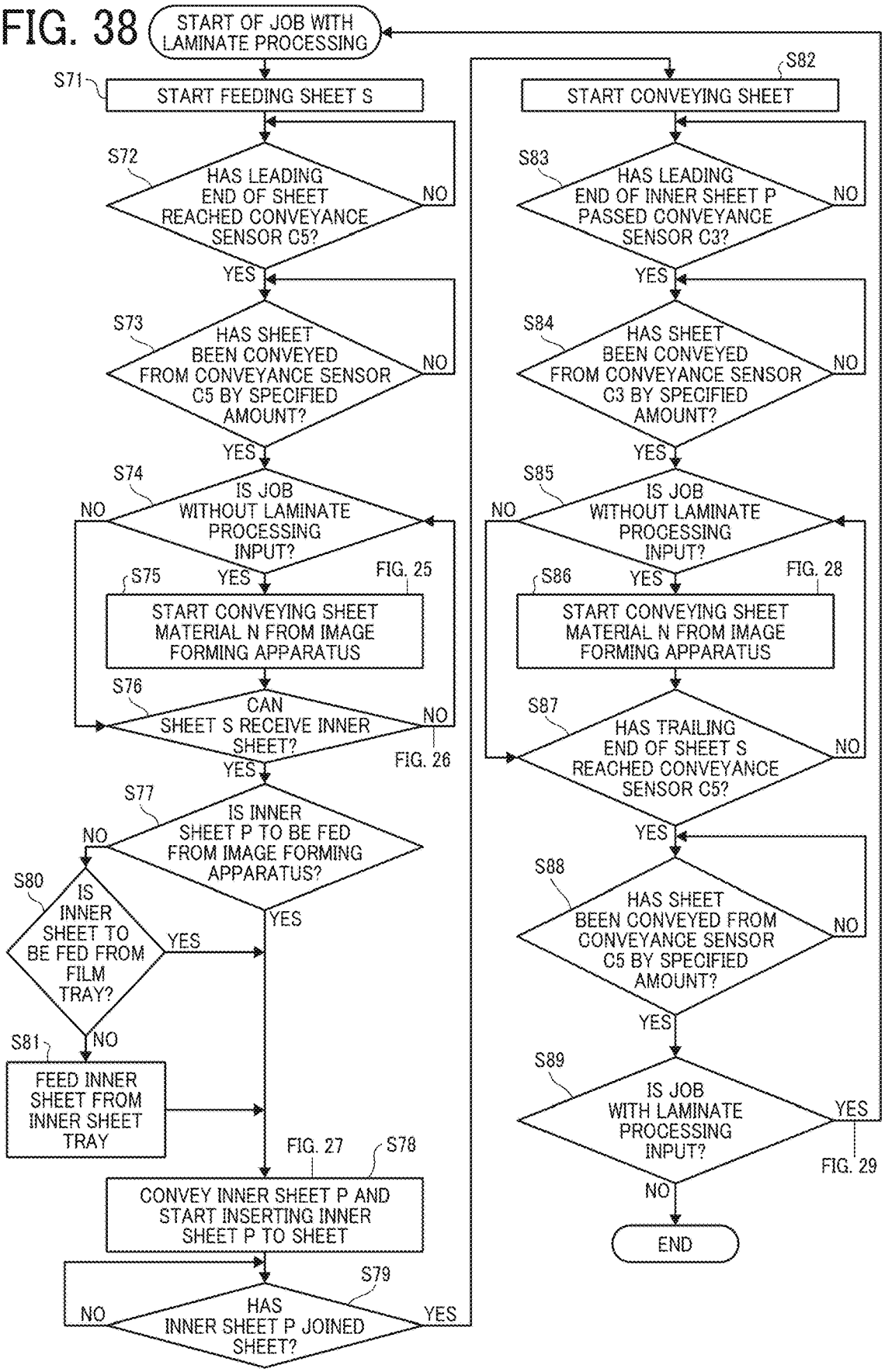
FIG. 38 is a flowchart illustrating a series of operations in the image forming system illustrated in FIGS. 25 to 29.

FIG. 38 is a flowchart illustrating a series of operations in the image forming system 1000 illustrated in FIGS. 25 to 29. When a job with laminate processing (job 1) is started, the sheet processing device 100 starts feeding of a lamination sheet S in step S71 and the controller 500 determines whether the leading edge of the lamination sheet S has reached the conveyance sensor C5 in step S72. When the leading edge of the lamination sheet S has reached the conveyance sensor C5 (YES in S72), the controller 500 determines whether the sheet has been conveyed by the designated amount from the conveyance sensor C5 in step S73. When the lamination sheet S is conveyed by the designated amount from the conveyance sensor C5 (YES in S73), the controller 500 determines whether a job without laminate processing is input in step S74. If there is a job without laminate processing (job 2) (YES in S74), the sheet processing device 100 starts conveyance of a sheet material N from the image forming apparatus 300 in step S75 (see FIG. 25). Next, the controller 500 determines whether the lamination sheet S can receive an inner sheet P in step S76. On the other hand, when there is no job without laminate processing in step S74 (NO in S74), the controller 500 determines whether the lamination sheet S can receive the inner sheet P in step S76.

If the lamination sheet S cannot receive the inner sheet P yet (NO in S76), the image forming apparatus 300 executes the job 2 and conveys the sheet material N. On the other hand, when the lamination sheet S can receive the inner sheet P (YES in S76), the controller 500 determines whether to feed the inner sheet P from the image forming apparatus 300 in step S77. When the inner sheet P is fed from the image forming apparatus 300 (YES in S77), the image forming apparatus 300 conveys the inner sheet P in step S78, and the sheet processing device 100 starts inserting the inner sheet P into the lamination sheet S (see FIG. 27).

Alternatively, when the inner sheet P is not fed from the image forming apparatus 300 (YES in S77), the controller 500 determines whether the inner sheet P is fed from the film tray (sheet tray 102) in step S80. In the case of YES in step S80, the process proceeds to step S78. In the case of NO in step S80, the sheet processing device 100 feeds an inner sheet P from the inner sheet tray (second sheet tray 152) in step S81, and proceeds to step S78.

Next, the controller 500 determines whether the inner sheet P is sandwiched in the lamination sheet S in step S79. When the inner sheet P is sandwiched in the lamination sheet S (YES in S79), the sheet processing device 100 starts conveyance of the lamination sheet S in the step S82, and the controller 500 determines whether the leading end of the inner sheet P has passed through the conveyance sensor C3 in the step S83. When the leading end of the inner sheet P has passed through the conveyance sensor C3 (YES in S83), the controller 500 determines whether the sheet has been conveyed from the conveyance sensor C3 by a designated amount in step S84. When the sheet is conveyed by the designated amount from the conveyance sensor C3 (YES in S84), the controller 500 determines whether a job without laminate processing is input in step S85. If there is a job (job 2) without laminate processing (YES in S85), the sheet processing device 100 starts conveyance of the sheet material N from the image forming apparatus 300 in step S86 (see FIG. 28). Next, the controller 500 determines whether the trailing end of the lamination sheet S has reached the conveyance sensor C5 in step S87. Alternatively, when there is no job without laminate processing in step S85 (NO in S85), the controller 500 determines whether the trailing end of the lamination sheet S has reached the conveyance sensor C5 in step S87.

Next, in step S88, the controller 500 determines whether the sheet has been conveyed from the conveyance sensor C5 by the designated amount. When the sheet has been conveyed by the designated amount from the conveyance sensor C5 (YES in S88), the controller 500 determines whether a job with laminate processing is input in step S89. If there is a job with laminate processing (YES in S89), the process returns to the start of the job with laminate processing (see FIG. 29), and this process flow is repeated. Alternatively, if there is no job with laminate processing (NOT in S89), the print job ends.

According to the present embodiment, the productivity of the entire system can be enhanced when it takes time to process one copy of a sheet. Thus, in addition to the above-described laminate processing, equivalent effects can be obtained with respect to processes such as a cutting process and an enclosing and sealing process.

FIG. 39 is a flowchart representing a series of operations from a start instruction of each sheet feeding to the sheet ejection. After the start of the operation is instructed by an operation start unit from the user, in step S11, the controller 500 determines whether the "laminate processing mode" is selected in the laminate processing setting illustrated in FIG. 13. If the sheet processing device 100 is not in the "laminate processing mode" (NO in S11), the sheet processing device 100 starts a sheet ejecting operation without performing laminate processing.

In step S12, the controller 500 determines whether the inner-sheet feeding and inserting operation is being performed in the "laminate processing mode". The sheet processing device 100 can start the interrupt operation of copy/print at any time when the sheet ejecting operation without laminate processing is not being performed in the "laminate processing mode" (NO in S12) as the start condition of the sheet ejecting operation without laminate processing. In contrast, when the sheet ejecting operation without laminate processing is being performed in the "laminate processing mode" (YES in S12), the sheet processing device 100 starts the operation after waiting until all the operations are completed (YES in S13).

When the "copy/print mode" is started, in step S14, the sheet processing device 100 causes the image forming apparatus 300 to start a sheet feeding operation, shifts to step S15, and forms an image on a sheet. Next, the process proceeds to step S16. In step S16, the sheet processing device 100 switches the position of the branch claw 119 to guide the sheet to the sheet ejection path 124 (see FIG. 15).

Next, the process proceeds to step S17. The controller 500 determines whether the laminate-sheet ejecting operation in the "laminate processing mode" is in progress. If the sheet ejecting operation is in progress (YES in S17), the process proceeds to step S18. In step S18, the sheet processing device 100 waits until the laminate-sheet ejecting operation is completed.

When the sheet ejecting operation is completed (YES in S18) or when the sheet ejecting operation is not in progress (NO in S17), the sheet processing device 100 shifts to the sheet ejecting operation. In other words, the sheet processing device 100 starts the sheet ejecting operation in step S19 and determines whether the sheet sorting mechanism 130 is provided in step S20. If the sheet sorting mechanism 130 is provided (YES in S20), the sheet processing device 100 moves the sheet sorting mechanism 130 to the stacking position of the non-laminate sheet in the step S21 (see FIG. 21), moves the ejection tray 104 to the sheet ejection port of the sheet ejection path 124 in the step S22 (see FIG. 19) and ejects the sheet to the ejection tray 104 in the step the step S22 (S23, Yes), and ejects the sheet to the ejection tray 104 in the step S24 (see FIG. 18). Alternatively, if the sheet sorting mechanism 130 is not provided in the step S20 (NO in S20), the process proceeds to the step S22. When no lift of the ejection tray 104 is provided in the step S22 (NO in S22), the process proceeds to the step S24.

On the other hand, if the "laminate processing mode" is selected in the laminate processing setting illustrated in FIG.

13 (YES in S11) after the operation start is instructed by the operation start unit from the user, the sheet processing device 100 starts the laminate processing operation.

In other words, in step S25, the sheet processing device 100 starts feeding the lamination sheet S (see FIG. 1). Next, in step S26, the controller 500 determines whether the leading edge of the lamination sheet S has reached the conveyance sensor C3 (see FIG. 1). In step S27, when the controller 500 determines that the lamination sheet S has been conveyed by the designated amount from the conveyance sensor C3, the controller 500 temporarily stops the conveyance (see FIG. 2). Subsequently, in step S28, the gripper 110 is opened, and the lamination sheet S is conveyed in the reverse conveyance direction in step S29 (see FIG. 3).

When the controller 500 determines that the lamination sheet S has been conveyed by the designated amount in step S30, the controller 500 temporarily stops the conveyance of the lamination sheet S in step S31. In step S32, the controller 500 causes the driver to close the gripper 110 to grip an end of the lamination sheet S (see FIG. 4).

In step S33, the controller 500 controls the driver to rotate the winding roller 109 counterclockwise (in reverse) and wind the lamination sheet S around the winding roller 109 (see FIG. 5). Next, in step S34, the controller 500 determines whether the leading edge of the lamination sheet S has reached the conveyance sensor C5. When the controller 500 determines that the lamination sheet S has been conveyed by the designated amount from the conveyance sensor C5 in step S35, the sheet processing device 100 detects the state of the lamination sheet S using the abnormality detection sensor C4 in step S36.

The abnormality state detector C4 is an abnormality detector to detect the size of the gap between the two sheets of the lamination sheet S for the sheet processing device 100 to determine whether the size of the gap exceeds the predetermined threshold. In step S37, the controller 500 determines whether the state of the lamination sheet S is normal, that is, whether the size of the gap between two sheet portions of the lamination sheet S is equal to or greater than the predetermined threshold based on the detection result of the abnormality state detector C4. When the state of the lamination sheet S is normal (YES in step S37), the process proceeds to step S38a.

By contrast, when it is determined that the state of the lamination sheet S is abnormal, in other words, when the size of the gap is smaller than the predetermined threshold (NO in step S37), the controller 500 causes the operation panel 10 to display the abnormality (e.g., displays an error message) and stops the series of operations of sheet processing job in step 38b.

When the process proceeds to step S38a, the sheet processing device 100 inserts the separation claws 116 into the generated space from both sides of the lamination sheet S (see FIG. 6). In step S39, the controller 500 causes the driver to rotate the winding roller 109 in the clockwise direction (i.e., in the forward direction) with the separation claws 116 inserted from both sides of the lamination sheet S, and convey the lamination sheet S in the forward conveyance direction.

Next, in step S40, the controller 500 determines whether the leading edge of the lamination sheet S has reached the conveyance sensor C5. In step S41, when the controller 500 determines that the lamination sheet S has been conveyed by the designated amount from the conveyance sensor C5, the sheet processing device 100 opens the gripper 110 in step S42.

In step S43, the controller 500 controls the driver to temporarily stop the conveyance of the lamination sheet S and, in step S44, move the separation claws 116 further in the sheet width direction (see FIGS. 7A and 7B). As a result, the trailing end of the lamination sheet S in the forward conveyance direction is separated into the upper and lower sheets.

In step S45, the controller 500 controls the driver to convey the lamination sheet S in the reverse conveyance direction. Next, in step S46, the controller 500 determines whether the leading edge of the lamination sheet S has reached the conveyance sensor C5. When the controller 500 determines in step S47 that the lamination sheet S has been conveyed by the designated amount from the conveyance sensor C5, the controller 500 temporarily stops the conveyance in step S48 (see FIG. 8). As a result, the separation of the lamination sheet S is completed.

In step S49, the sheet processing device 100 determines whether the sheet in the "copy/print mode" is being guided to the sheet feed or ejection path. As a sheet feed start condition of an inner sheet P after sheet separation, if the sheet processing device 100 is not during the operation of guiding the sheet in the "copy/print mode" to the sheet feed or ejection path (NO in S49), the sheet processing device 100 can start the interruption operation of the feeding operation of the inner sheet P and the insertion operation to the lamination sheet S at any time. If the sheet processing device 100 is during the operation of guiding the sheet in the "copy/print mode" to the sheet feed or ejection path (YES in S49), the sheet processing device 100 waits until all the operations are completed and starts the operation (YES in S50).

Next, the sheet processing device 100 shifts to the operation of feeding the inner sheet P and the operation of inserting the inner sheet P into the lamination sheet S. In step S51, the sheet processing device 100 feeds the inner sheet P from the image forming apparatus 300 (see FIG. 9), forms an image on the inner sheet P in step S52, and guides the sheet to the sheet processing path 99 by switching the position of the branch claw 119 in step S53 (see FIG. 14). Next, the sheet processing device 100 conveys the inner sheet P and inserts the inner sheet P between separated portions of the lamination sheet S in step S54 (see FIGS. 10 and 11). When the controller 500 determines that the lamination sheet S has been conveyed by a designated amount from the conveyance sensor C2 in step S55, the controller 500 switches the branch claw 119 to guide the lamination sheet S to the heat-pressing roller 120 (see FIG. 12).

Next, the sheet processing device 100 fixes the lamination sheet S by a heat fixing device Md in step S57, and completes the fixing of the laminate sheet in step S58. Next, when the sheet processing device 100 determines that the sheet ejecting operation in the "copy/print mode" is being performed in step S59 (YES in S59, the sheet processing device 100 waits until the sheet ejecting operation is completed in step S60.

Next, when the sheet ejecting operation is completed (YES in S60) or when the sheet ejecting operation is not in progress (NO in S59), the process proceeds to the laminate-sheet ejecting operation. In other words, the sheet processing device 100 starts the operation of ejecting the laminate sheet in step S61 and the controller 500 determines whether the sheet sorting mechanism 130 is provided in step S62. If the sheet sorting mechanism 130 is provided (YES in S62), the sheet processing device 100 moves the sheet sorting mechanism 130 to the stacking position of the laminate sheet in the step S63 (see FIG. 21). If the lift for the ejection tray 104 is provided in the step S64 (YES in S64), the sheet processing device 100 moves the ejection tray 104 to the sheet ejection port of the laminate processing path in the step S65 (see FIG. 19), and ejects the laminate sheet to the ejection tray 104 in the step S66 (see FIG. 18). Thus, the sheet ejection is finished.

Regarding the guide to the sheet processing path 99 and the sheet ejection path 124, the branch claw 119 disposed upstream of the sheet processing path 99 is operated to guide and convey sheets to each path. Accordingly, during the inner-sheet feeding and inserting operation (see FIG. 14) and during the guiding operation of the sheet to the sheet feeding or ejection path (see FIG. 15) in the "laminate processing mode" in which the branch claw 119 is in operation, the process waits until each operation is completed.

Thus, mutual sheet interference of sheets fed in laminate processing and sheet ejection is prevented, thus allowing interruption operation and enhancing productivity.

The determination as to whether the inner-sheet feeding and inserting operation and the operation of guiding the sheet to the sheet feeding or ejection path have been completed can be made by using a change in the conveyance sensor C2 as a trigger and determining that each sheet processing has been completed based on the conveyance amount or the elapsed time after the detection of the absence of sheet after passage of the trailing end of the inner sheet P or the sheet of paper.

In addition, notifying the image forming apparatus 300 of the start of the print job after the completion of the sheet separation (S48) causes the image forming apparatus 300 to print and convey the inner sheet P. In this case, the winding roller 109, which is the separation device, is stopped until the inner sheet P is printed and conveyed to reach the conveyance sensor C3. Accordingly, in order to enhance the productivity, notifying the image forming apparatus of the start of the print job may be performed after the completion (S44) of the peeling claw operation illustrated in, for example, FIG. 7 in consideration of the inner-sheet conveyance time.

As described above, according to at least one embodiment of the present disclosure, there are provided the sheet ejection path 124 through which a sheet is ejected without passing through the sheet processing path 99 of the sheet processing device 100 and the branch claw 119 serving as a switching unit to guide the sheet to the sheet ejection path 124 upstream from the sheet processing path 99. Accordingly, even during the processing of the sheet S in the sheet processing path 99, copying, printing, or the like that does not require lamination processing can be performed without causing a decrease in image quality and productivity.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. The elements of the above-described embodiments can be modified without departing from the gist of the present disclosure, and can be appropriately determined according to the application form.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An image forming system, comprising:
an image forming apparatus to form an image on an inner sheet;
a sheet processing device to perform post-processing on a two-ply sheet, in which two sheets are overlaid and partially bonded, to sandwich the inner sheet,
the sheet processing device including:
a first conveyance path through which the two-ply sheet is to be conveyed and subjected to the post-processing; and
a second conveyance path through which the inner sheet is to be conveyed without being subjected to the post-processing; and
control circuitry configured to: in response to an instruction of a plurality of print jobs including both a print job of one copy or N copies subjected to the post-processing and a print job not subjected to the post-processing, execute the print job not subjected to the post-processing during execution of an M-th copy of the print job subjected to the post-processing; and
cause the inner sheet to be conveyed through the second conveyance path,
where N is equal to or greater than two and M satisfies a relation of $1 \leq M < N$.

2. The image forming system according to claim 1, wherein the control circuitry is configured to:
execute the print job not subjected to the post-processing during execution of the M-th copy of the print job subjected to the post-processing; and
start an (M+1)-th copy of the print job subjected to the post-processing before completion of the print job not subjected to the post-processing.

3. The image forming system according to claim 1, further comprising an operation panel to display a screen for selecting whether the inner sheet conveyed from the image forming apparatus can be conveyed through the second conveyance path of the sheet processing device during execution of the post-processing of the M-th copy in the print job of the one copy or N-th copies.

4. The image forming system according to claim 1, wherein the sheet processing device includes an ejection tray to stack the two-ply sheets post-processed without passing through the second conveyance path.

5. The image forming system according to claim 4, wherein the sheet processing device includes a lift to raise or lower the ejection tray in accordance with the first conveyance path or the second conveyance path.

6. The image forming system according to claim 4, wherein the sheet processing device includes a sheet sorter to change a stack position at which the two-ply sheet post-processed is stacked on the ejection tray in a direction orthogonal to a direction of conveyance of the two-ply sheet, and
wherein the sheet sorter is to sort post-processed two-ply sheets ejected onto the ejection tray.

7. The image forming system according to claim 1, wherein the sheet processing device includes a switch disposed upstream from a sheet processing path in a direction of conveyance of the inner sheet and to switch a conveyance destination of the inner sheet to a sheet ejection path or the sheet processing path in accordance with information on the inner sheet.

8. The image forming system according to claim 7,
wherein the information on the inner sheet indicates whether the inner sheet is a sheet to be sandwiched between separated portions of the two-ply sheet or a sheet not to be sandwiched between the separated portions of the two-ply sheet, and
wherein the control circuitry is configured to cause the switch to guide the sheet to be sandwiched between the separated portions of the two-ply sheet to the sheet processing path and guide the sheet not to be sandwiched between the separated portions of the two-ply sheet to the sheet ejection path.

9. The image forming system according to claim 8,
wherein the control circuitry is configured to: in response to an instruction to form an image on the sheet not to be sandwiched between the separated portions of the two-ply sheet during processing of the two-ply sheet in the sheet processing path,
cause the image forming apparatus to form the image on the sheet not to be sandwiched between the separated portions of the two-ply sheet before forming an image on the sheet to be sandwiched between the separated portions of the two-ply sheet; and
cause the switch to guide the sheet on which the image is formed to the sheet ejection path.

10. The image forming system according to claim 8,
wherein the control circuitry is configured to:
in response to an instruction to form an image on the sheet not to be sandwiched between the separated portions of the two-ply sheet during processing of the two-ply sheet and the sheet to be sandwiched between the separated portions of the two-ply sheet in the sheet processing path,
cause the image forming apparatus to form the image on the sheet not to be sandwiched between the separated portions of the two-ply sheet; and
cause the switch to guide the sheet on which the image is formed to the sheet ejection path.

11. The image forming system according to claim 7, further comprising an operation panel to display a screen for selecting a copy or print mode or a sheet processing mode,
wherein the information on the inner sheet is information on an instruction of copying, printing, or sheet processing, and
wherein the control circuitry is configured to cause the switch to guide a sheet not to be sandwiched between the separated portions of the two-ply sheet to the sheet ejection path, in response to a selection of the copy or print mode.

12. An image forming system, comprising:
an image forming apparatus to form an image on an inner sheet;
a sheet processing device configured to perform post-processing on a two-ply sheet, in which two sheets are overlaid and partially bonded, to sandwich the inner sheet;
the sheet processing device including:
a sheet loader to load the two-ply sheet;
a sheet processing path in which the two-ply sheet is to be separated to sandwich the inner sheet between separated portions of the two-ply sheet; and
a sheet ejection path through which the inner sheet is to be ejected without passing through the sheet processing path; and
control circuitry configured to: in response to an instruction of a plurality of print jobs including both a print job of one copy or N copies subjected to the post-processing and a print job not subjected to the post-processing,
execute the print job not subjected to the post-processing during execution of an M-th copy of the print job subjected to the post-processing; and
cause the inner sheet to be conveyed through the sheet ejection path,
where N is equal to or greater than two and M satisfies a relation of 1≤M<N.

13. The image forming system according to claim 12,
wherein the sheet loader is to load the inner sheet to be sandwiched between the separated portions of the two-ply sheet and supply the inner sheet.

14. The image forming system according to claim 13, further comprising an operation panel to display a screen for selecting whether to supply the inner sheet from the image forming apparatus or the sheet loader.

15. The image forming system according to claim 12,
wherein the sheet processing device includes another sheet loader to load and supply the inner sheet to be sandwiched between the separated portions of the two-ply sheet.

16. The image forming system according to claim 15, further comprising an operation panel to display a screen for selecting whether to supply the inner sheet from the image forming apparatus or said another sheet loader.

17. The image forming system according to claim 12, further comprising a thermal presser disposed on the sheet processing path to heat and press the two-ply sheet.

18. An image forming apparatus, comprising:
an image forming device to form an image on an inner sheet;
a sheet processing device to perform post-processing on a two-ply sheet, in which two sheets are overlaid and partially bonded, to sandwich the inner sheet,
the sheet processing device including:
a first conveyance path through which the two-ply sheet is to be conveyed and subjected to the post-processing; and
a second conveyance path through which the inner sheet is to be conveyed without being subjected to the post-processing; and
control circuitry configured to: in response to an instruction of a plurality of print jobs including both a print job of one copy or N copies subjected to the post-processing and a print job not subjected to the post-processing,
execute the print job not subjected to the post-processing during execution of an M-th copy of the print job subjected to the post-processing; and
cause the inner sheet to be conveyed through the second conveyance path,
where N is equal to or greater than two and M satisfies a relation of 1≤M<N.

19. A sheet processing device to perform post-processing on a two-ply sheet (S), in which two sheets are overlaid and partially bonded, to sandwich the inner sheet, comprising:
a first conveyance path through which the two-ply sheet is to be conveyed and subjected to post-processing; and
a second conveyance path through which the inner sheet is to be conveyed downstream in a conveyance direction without being subjected to the post-processing; and
control circuitry configured to:
in response to an instruction of a plurality of print jobs including both a print job of one copy or N copies subjected to the post-processing and a print job not subjected to the post-processing, execute the print job not subjected to the post-processing during execution of an M-th copy of the print job subjected to the post-processing; and cause the inner sheet to be conveyed through the second conveyance path, where N is equal to or greater than two and M satisfies a relation of $1 \leq M < N$.

* * * * *